(12) United States Patent
Suzuki et al.

(10) Patent No.: US 7,582,355 B2
(45) Date of Patent: Sep. 1, 2009

(54) OPTICAL UNIT USING PLASTIC LENSES

(75) Inventors: Fumiyuki Suzuki, Tokyo (JP); Noriko Eiha, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 381 days.

(21) Appl. No.: 11/203,974

(22) Filed: Aug. 16, 2005

(65) Prior Publication Data

US 2006/0046065 A1    Mar. 2, 2006

(30) Foreign Application Priority Data

Aug. 31, 2004    (JP)    ............... 2004-252596

(51) Int. Cl.
*B32B 27/36* (2006.01)
*B32B 9/04* (2006.01)

(52) U.S. Cl. ............. 428/412; 252/182.17; 252/182.18; 359/109; 359/642; 528/196; 528/198; 528/491

(58) Field of Classification Search ............ 252/182.17, 252/182.18; 359/109, 642; 428/412; 528/196, 528/198, 491
See application file for complete search history.

(56) References Cited

U.S. PATENT DOCUMENTS 6,008,296 A * 12/1999 Yang et al. .................. 525/123

FOREIGN PATENT DOCUMENTS

JP    2001-279083    * 10/2001

OTHER PUBLICATIONS

F. Ide, "Kokomadekita Tomeijushi (Transparent Resins Now)", p. 29, Kogyo Chosakai Publishing, Inc., 2001.
"Jikken Kagaku Koza (A Course in Experimental Chemistry)", 4th ed. (28) Kobunshi Gosei (Polymer Syntheses), pp. 231-242, Maruzen Publishing Company (1988).

* cited by examiner

*Primary Examiner*—Terressa M Boykin
(74) *Attorney, Agent, or Firm*—Sughrue Mion, PLLC

(57) ABSTRACT

The present invention provides an optical unit for high-resolution applications all lenses in which are made of plastics. The optical unit includes lens (1) and (2). The lens (1) is a plastic lens having an Abbe number of 45-60. The lens (2) is a lens injection molded from a polycarbonate material comprising a structure derived from spirobiindan and having a glass transition temperature of 120-150° C.

43 Claims, 3 Drawing Sheets

OPTICAL UNIT USING PLASTIC LENSES

FIELD OF THE INVENTION

This invention relates to optical units for high-resolution applications that may typically be used in silver photographic cameras, digital cameras, video cameras, and miniature cameras that can be built into cell phones.

As recent years have seen a rapid increase in the resolving power of imaging semiconductors and reduction of their cost, it is also required that the optical units they use meet the requirements for higher resolving power, as well as smaller size and lighter weight, and lower cost. In order to meet the requirements for smaller size and lighter weight as well as for lower cost, it is desirable to use plastic lenses in optical units and particularly in low-resolution applications, there are commonly used optical units all lenses in which are made of plastics.

However, plastic materials have greater birefringence than glass, which has an adverse effect on resolution if they are used as lenses in optical units. This has not been any serious problem in low-resolution applications where only low resolution is required. However, in high-resolution applications, particularly in the case where the resolution as expressed in spatial frequency (MTF or modulation transfer function) is about 150 lines/mm or more, preferably about 200 lines/mm or more, at 20% contrast, no desired resolution is attained, so it has been impossible to produce an optical unit all lenses of which are made of plastics.

It is common practice in the optical designing of optical units to correct chromatic aberration by using a plurality of lenses having different Abbe numbers. In the case of optical units for high-resolution applications, the above-mentioned problem of birefringence in plastic lenses makes it necessary to correct chromatic aberration by combining a plastic lens with a glass lens having a different Abbe number.

As the plastic lens for use in combination with the glass lens, lenses of alicyclic polyolefin resins having Abbe numbers of 45-60 are widely used since they have preferred characteristics for use in optical units. Such alicyclic polyolefin resins are commercially available in various names such as ZEONEX™ of ZEON Corporation, ARTON™ of JSR Corporation, and APEL™ of Mitsui Chemicals, Inc.

Hence, for optical designing of an optical unit all lenses in which are entire of plastics, the above-described lens of an alicyclic polyolefin resin having an Abbe number of 45-60 is combined with a lens of plastic material having a different Abbe number in order to correct chromatic aberration. In optical units for low-resolution applications, specifically those providing a resolution of less than about 100 lines/mm at 20% contrast, chromatic aberration is currently corrected by combining lenses of alicyclic polyolefin resins having Abbe numbers of 45-60 with lenses of polycarbonate resins of bisphenol A type having lower Abbe numbers (say, about 30). However, conventional polycarbonate resins such as ones of bisphenol A type generally have a large intrinsic birefringence at 0.106 (see "Kokomadekita Tomeijushi (Transparent Resins Now)" by F. Ide, page 29, Kogyo Chosakai Publishing, Inc., 2001) and it has been impossible to apply them to optical units for high-resolution applications.

Thus, no plastic materials have been known to date that have Abbe numbers suitable for correcting chromatic aberration by being combined with lenses of alicyclic olefin resins having Abbe numbers of 45-60 and which have small birefringence as well as physical properties suitable for use as lens materials in optical units.

SUMMARY OF THE INVENTION

An object, therefore, of the present invention is to provide an optical unit for high-resolution applications all lenses in which are made of plastics.

In order to attain the above-mentioned object, this invention provides an optical unit comprising lens (1) and (2) described below:

(1) a plastic lens having an Abbe number of 45-60; and (2) a lens injection molded from a polycarbonate material comprising a structure derived from spirobiindan and having a glass transition temperature of 120-150° C.

Preferably, said polycarbonate material comprises a polycarbonate copolymer (A) having structural units represented by the following general formulas (1) and (2):

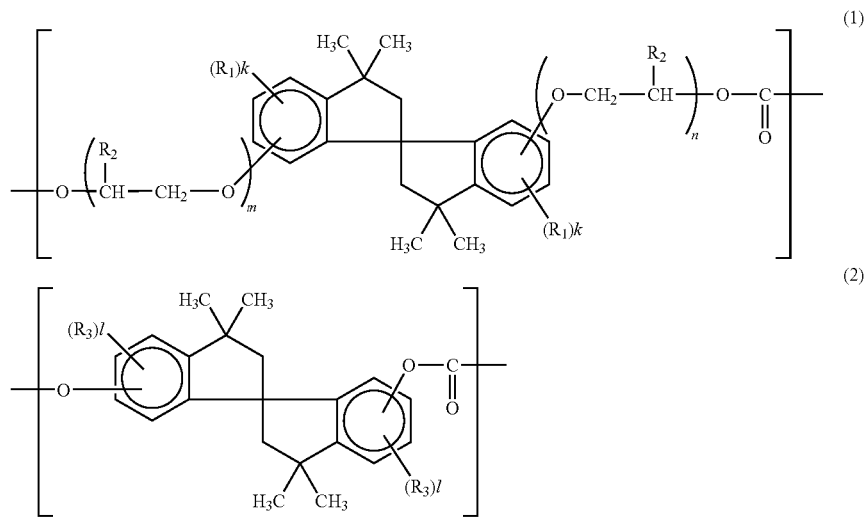

where $R_1$ and $R_3$ are each independently an alkyl group, an alkoxy group, a nitro group or a halogen atom; $R_2$ is a hydrogen atom or a methyl group; k and l are each independently an integer of 0-3; m and n are each independently an integer of 0-20, provided that at least one of m and n is other than zero.

Optionally, said polycarbonate material further contains 0.0005-5 parts by mass of an epoxy compound for 100 parts by mass of said polycarbonate copolymer (A).

Optionally, said polycarbonate material further contains 0.0005-5 parts by mass of a phosphite compound for 100 parts by mass of said polycarbonate copolymer (A).

Optionally, said polycarbonate material further contains 0.0005-5 parts by mass of an aliphatic compound for 100 parts by mass of said polycarbonate copolymer (A).

Optionally, said polycarbonate material further contains 0.00005-0.5 parts by mass of a pentavalent phosphorus compound for 100 parts by mass of said polycarbonate copolymer (A).

Preferably, in said polycarbonate copolymer (A), the proportion of the structural units of the general formulas (1) and (2) that is occupied by the structural unit of the general formula (1) is 5-90 mol %.

Preferably, said polycarbonate material (A) has a mass average molecular weight of 10,000-150,000.

Preferably, in the optical unit of the present invention, said polycarbonate material comprises a polycarbonate copolymer (B) having structural units represented by the following general formulas (2) and (3):

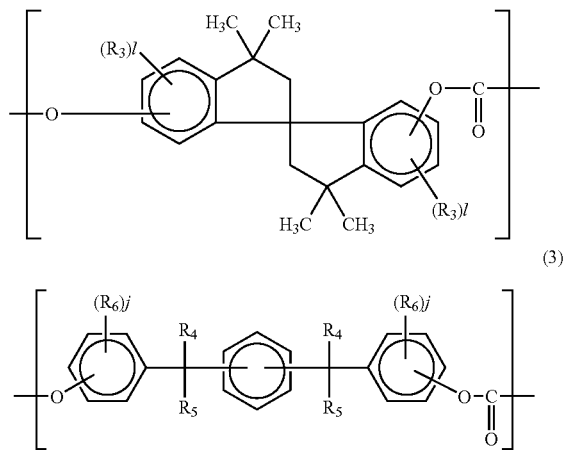

where $R_3$'s are each independently an alkyl group, an alkoxy group, a nitro group or a halogen atom; $R_4$ and $R_5$ are each independently a hydrogen atom or a methyl group; $R_6$'s are each independently an alkyl group, an alkoxy group or a halogen atom; l's are each independently an integer of 0-3; and j's are each independently an integer of 0-2.

Optionally, said polycarbonate material further contains 0.0005-5 parts by mass of an epoxy compound for 100 parts by mass of said polycarbonate copolymer (B).

Optionally, said polycarbonate material further contains 0.0005-5 parts by mass of a phosphite compound for 100 parts by mass of said polycarbonate copolymer (B).

Optionally, said polycarbonate material further contains 0.0005-5 parts by mass of an aliphatic compound for 100 parts by mass of said polycarbonate copolymer (B).

Optionally, said polycarbonate material further contains 0.00005-0.5 parts by mass of a pentavalent phosphorus compound for 100 parts by mass of said polycarbonate copolymer (B).

Preferably, in said polycarbonate copolymer (B), the proportion of the structural units of the general formulas (2) and (3) that is occupied by the structural unit of the general formula (2) is 5-90 mol %.

Preferably, said polycarbonate material (B) has a mass average molecular weight of 10,000-150,000.

Preferably, in the optical unit of the present invention, said polycarbonate material comprises a polycarbonate copolymer (C) that has structural units represented by the following general formulas (4), (5) and (6) and wherein the structural unit of the general formula (4) assumes 5-50 mole % in all structural units:

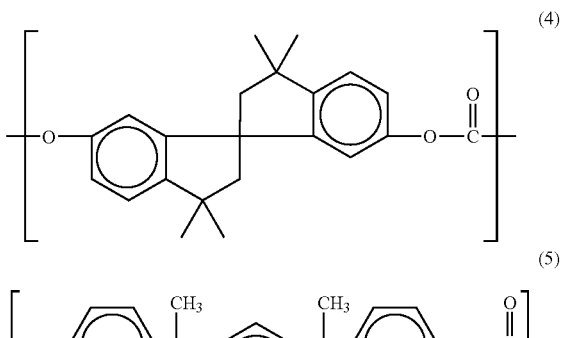

Preferably, said polycarbonate copolymer (C) is the product of reaction of 6,6'-dihydroxy-3,3,3',3'-tetramethyl-1,1'-spirobiindan, 4,4'-[1,3-phenylenebis(1-methylethylidene)]bisphenol, 4,4'-[1,4-phenylenebis(1-methylethylidene)]bisphenol and a carbonic ester forming compound.

Preferably, said carbonic ester forming compounds is at least one member of the group consisting of phosgene and bisaryl carbonates including diphenyl carbonate, di-p-tolyl carbonate, phenyl-p-tolyl carbonate, di-p-chlorophenyl carbonate, and dinaphthyl carbonate.

Preferably, the amount in which 6,6'-dihydroxy-3,3,3',3'-tetramethyl-1,1'-spirobiindan is used in said polycarbonate copolymer (C) is 10-90 mol % with respect to the sum of 6,6'-dihydroxy-3,3,3',3'-tetramethyl-1,1'-spirobiindan and 4,4'-[1,3-phenylenebis(1-methylethylidene)]bisphenol.

Preferably, the structural unit represented by the above general formula (5) assumes 20-80 mol % in all structural units of the polycarbonate copolymer (C).

Preferably, in the optical unit of the present invention, said polycarbonate material comprises a polycarbonate copolymer (D) that has structural units represented by the following general formulas (4), (5) and (7) and wherein the structural unit of the general formula (4) assumes 5-50 mole % in all structural units:

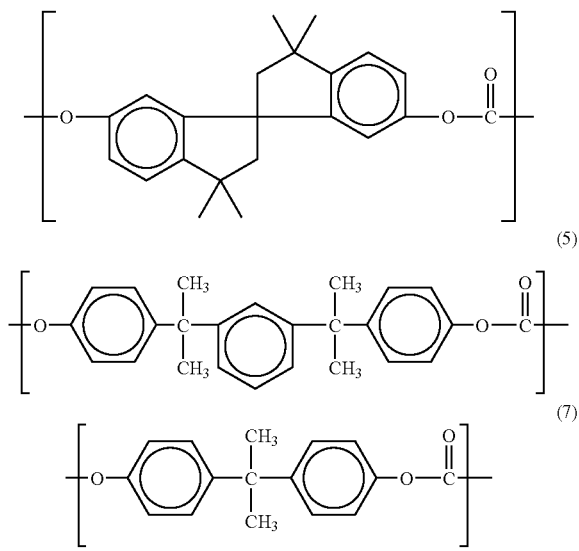

(4)

(5)

(7)

Preferably, in the optical unit of the present invention, said polycarbonate material comprises a polycarbonate copolymer (E) being the product of reaction of 6,6'-dihydroxy-3,3,3',3'-tetramethyl-1,1'-spirobiindan, 4,4'-[1,3-phenylenebis(1-methylethylidene)]bisphenol, a compound having a trifunctional or higher phenolic hydroxyl group and a carbonic ester forming compound.

Preferably, said carbonic ester forming compounds is at least one member of the group consisting of phosgene and bisaryl carbonates including diphenyl carbonate, di-p-tolyl carbonate, phenyl-p-tolyl carbonate, di-p-chlorophenyl carbonate, and dinaphthyl carbonate.

Preferably, the amount in which 6,6'-dihydroxy-3,3,3',3'-tetramethyl-1,1'-spirobiindan is used in said polycarbonate copolymer (E) is 10-90 mol % with respect to the sum of 6,6'-dihydroxy-3,3,3',3'-tetramethyl-1,1'-spirobiindan and 4,4'-[1,3-phenylenebis(1-methylethylidene)]bisphenol.

Preferably, said polycarbonate copolymer (E) contains the compound having a trifunctional or higher phenolic hydroxyl group added in an amount of 0.2-3.0 parts by mole with respect to 100 parts by mole as the sum of 6,6'-dihydroxy-3,3,3',3'-tetramethyl-1,1'-spirobiindan and 4,4'-[1,3-phenylenebis(1-methylethylidene)]bisphenol.

Preferably, the compound having a trifunctional or higher phenolic hydroxyl group in said polycarbonate copolymer (E) is at least one member of the group consisting of 1,1,1-tris(4-hydroxyphenyl)ethane, 4,4'-[1-[4-[1-(4-hydroxyphenyl)-1-methylethyl]phenyl]ethylidene]bisphenol, and 2,4,6-tris(4-hydroxyphenyl)-2,6-dimethyl-3-heptene.

Preferably, in the optical unit of the present invention, said polycarbonate material has an intrinsic viscosity of 0.25-0.50.

More preferably, said intrinsic viscosity is 0.25-0.35.

Preferably, in the optical unit of the present invention, said plastic lens having an Abbe number of 45-60 is fabricated from an alicyclic polyolefin resin.

Preferably, in the optical unit of the present invention, said polycarbonate material further contains an ultraviolet absorber.

In the optical unit of the present invention, all lenses are made of plastics and yet there will be no adverse effect on resolution due to birefringence and the optical unit is satisfactory for use in high-resolution applications.

Since all lenses in the optical unit of the present invention are made of plastics, it is suitable for use in applications that require smaller size and lighter weight.

In the optical unit of the present invention, the lens of lower Abbe number is made of a specified polycarbonate material having good flowability, so it can be injection molded at lower temperatures with better moldability. As a result, lenses can be produced at high enough rate to enable cost reduction in the fabrication of optical units. In addition, the better moldability in injection molding permits the use of lenses of various shapes.

If the polycarbonate material that composes the lens of lower Abbe number in the optical unit of the present invention contains a UV absorber, the lightfastness of the lens is sufficiently improved to ensure that the optical unit exhibits the desired optical characteristics for an extended period of time.

DESCRIPTION OF THE PREFERRED EMBODIMENTS

The optical unit of the invention is described below in detail with reference to the accompanying drawings.

Figure 1:
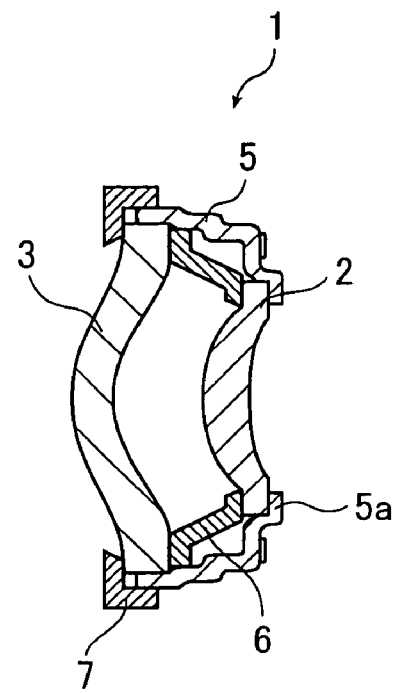
FIG. 1 is a diagrammatic section of an embodiment of the optical unit of the invention as cut through a plane including the optical axis.

FIG. 1 is a diagrammatic section of an embodiment of the optical unit of the invention as cut through a plane including the optical axis. The optical unit generally indicated by 1 in FIG. 1 is a general optical unit setup for use in a lens mechanism in a silver photographic camera or in an imaging module in a digital camera, a video camera or a miniature camera that can be built into a cell phone. Stated briefly, the optical unit shown in FIG. 1 comprises two lens elements 2 and 3 that are assembled into a generally cylindrical lens barrel 5 and fixed in position by means of a lens clamp 7. In addition, the optical unit shown in FIG. 1 has a spacer 6 interposed between the lenses 2 and 3.

More specifically, the lens barrel 5 consists of three cylindrical regions that have a common center but different diameters and which are arranged in the order of decreasing diameter along the optical axis of the optical unit 1. The smallest-diameter cylindrical region of the lens barrel 5 has an annular rib portion 5a formed on its end face to protrude inwardly. The inside of the rib portion 5a serves as an aperture through which incident light (e.g. taking light) is launched.

The smallest-diameter region of the lens barrel 5 is such that lens 2 can be assembled into it. In other words, the inside diameter of that region is generally equal to but slightly larger than the outside diameter of the lens 2. The largest-diameter portion of the lens barrel 5 is such that lens 3 can be assembled into it. In other words, the inside diameter of that region is generally equal to but slightly larger than the outside diameter of the lens 3.

Figure 2A:
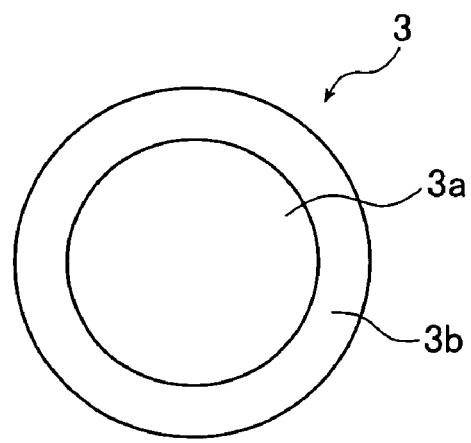
FIG. 2A is a front view of lens 3 in the optical unit of the invention as seen in a direction parallel to the optical axis in order to illustrate the shape of lens 3.
Figure 2B:
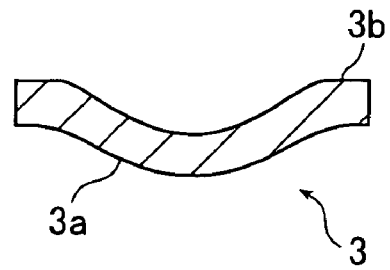
FIG. 2B is a section of lens 3 as cut through a plane including the optical axis.

FIGS. 2A and 2B illustrate the shape of lens 3; FIG. 2A is a front view of lens 3 as seen in a direction parallel to the optical axis and FIG. 2B is a section of lens 3 as cut through a plane including the optical axis. As shown, lens 3 consists of an optically active lens portion 3a that is surrounded by a flange portion 3b. Although not shown, lens 2 has the same structure and consists of an optically active lens portion that is surrounded by a flange portion.

In the optical unit 1 of the present invention, lens 2 is a plastic lens having an Abbe number of 45-60 (hereunder referred to as a "high Abbe number lens") and it is preferably made of an alicyclic polyolefin resin with an Abbe number of 45-60.

Lens 3 is a lens produced by injection molding a specified polycarbonate material to be described later in detail and it has an Abbe number sufficient to correct chromatic aberration in combination with lens 2, more specifically an Abbe number of from about 23 to about 35 (the lens is hereunder referred to as a "low Abbe number lens").

Lens 2 is assembled into the smallest-diameter region of the lens barrel 5 on the side where the rib portion 5a protrudes (at the aperture through which incident light is launched), and the flange portion of the lens 2 is brought into contact with the rib portion 5a so as to determine the position of the lens 2 in a direction parallel to the optical axis. On the other hand, the lens 3 is assembled into the largest-diameter region of the lens barrel 5.

The spacer 6 is a generally cylindrical member having at opposite ends those portions which contact the flange portions of the lenses 2 and 3; as already mentioned, the spacer 6 is inserted between the lenses 2 and 3 within the lens barrel 5. By choosing the axial length of the spacer 6, the relative positions of the lenses 2 and 3 in the axial direction can be determined appropriately.

In addition, the lenses 2 and 3, as well as the lens barrel 5 and the spacer 6 are all molded in such a way that when the lenses 2 and 3 are assembled into the lens barrel 5, their optical axes are in alignment.

To construct the optical unit shown in FIG. 1, the lens 2, spacer 6 and the lens 3 are sequentially assembled into the lens barrel 5 and the lens 2 is pressed toward the rib 5a by means of the lens clamp 7. The lens clamp 7 working in that way is fixed to the lens barrel 5 with an adhesive or by other means so that the optical unit 1 is fabricated.

In the optical unit of the present invention, the low Abbe number lens material is a polycarbonate material comprising a structure derived from spirobiindan and having a glass transition temperature of 120-150° C.

In the optical unit shown in FIG. 1, the surfaces of the lenses 2 and 3 are usually provided with films that impart the desired characteristics. For example, an anti-reflection film may be formed by sputtering. If the glass transition temperature of the low Abbe number lens material is less than 120° C., the lens is incapable of withstanding the temperature applied during the formation of an anti-reflection film by sputtering. On the other hand, if the glass transition temperature of the low Abbe number lens material is in excess of 150° C., the lens needs to be injection molded at an elevated polymer temperature, potentially causing it to deteriorate thermally.

The following are specific examples of the polycarbonate material suitable as the low Abbe number lens material.

In the optical unit of the present invention, one mode of the low Abbe number lens material comprises a polycarbonate copolymer (A) having structural units represented by the following general formulas (1) and (2):

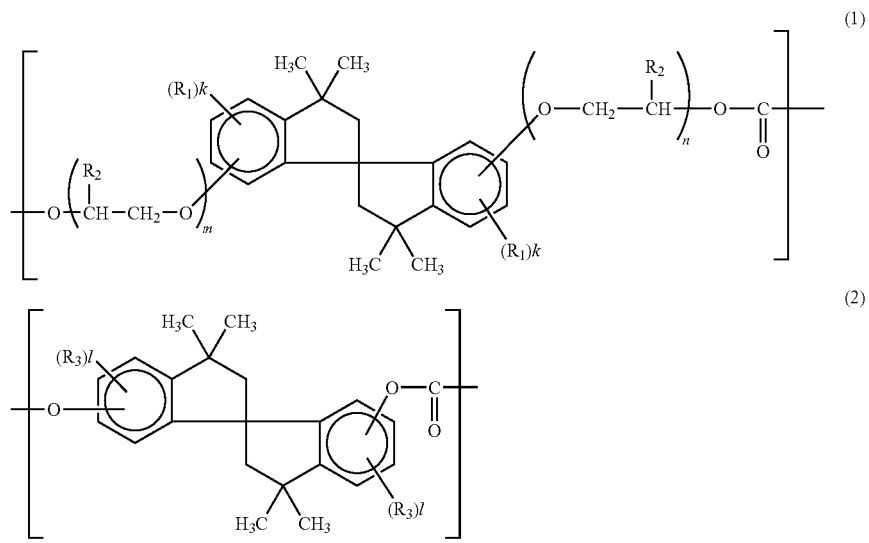

where $R_1$ and $R_3$ are each independently an alkyl group, an alkoxy group, a nitro group or a halogen atom; $R_2$ is a hydrogen atom or a methyl group; k and l are each independently an integer of 0-3; m and n are each independently an integer of 0-20, provided that at least one of m and n is other than zero.

In the structural units represented by the above general formulas (1) and (2), $R_1$ and $R_3$ are each independently an alkyl group, an alkoxy group, a nitro group or a halogen atom, preferably an optionally substituted linear, branched or cyclic alkyl group, an optionally substituted linear, branched or cyclic alkoxy group, a nitro group or a halogen atom, more preferably an optionally substituted linear, branched or cyclic alkyl group having 1-20 carbon atoms, an optionally substituted linear, branched or cyclic alkoxy group having 1-20 carbon atoms, a nitro group or a halogen atom. The substituent on the alkyl or alkoxy group as $R_1$ and $R_3$ may be exemplified by an alkoxy group, an alkoxyalkoxy group, a cycloalkyl group, a cycloalkyl group containing a hetero atom, a cycloalkoxy group, a cycloalkoxy group containing a hetero atom, an aryloxy group, an aryloxyalkoxy group, a halogen atom, etc.

Specific examples of the substituents $R_1$ and $R_3$ include a methyl group, an ethyl group, an n-propyl group, an isopropyl group, an n-butyl group, an isobutyl group, a sec-butyl group, a tert-butyl group, an n-pentyl group, an n-hexyl group, a 2-ethylhexyl group, an n-octyl group, an n-decyl group, an n-dodecyl group, an n-tetradecyl group, an n-octadecyl group, a cyclopentyl group, a cyclohexyl group, a 4-tert-butylcyclohexyl group, a cycloheptyl group, a cyclooctyl group, a cyclohexylmethyl group, a cyclohexylethyl group, a tetrahydrofurfuryl group, a 2-methoxyethyl group, a 2-ethoxyethyl group, a 2-n-butoxyethyl group, a 3-methoxypropyl group, a 3-ethoxypropyl group, a 3-n-propoxypropyl group, a 3-n-butoxypropyl group, a 3-n-hexyloxypropyl group, a 2-methoxyethoxyethyl group, a 2-ethoxyethoxyethyl group, a 2-phenoxymethyl group, a 2-phenoxyethoxyethyl group, a chloromethyl group, a 2-chloroethyl group, a 3-chloropropyl group, a 2,2,2-trichloroethyl group, a methoxy group, an ethoxy group, an n-propoxy group, an isopropoxy group, an n-butoxy group, an isobutoxy group, a sec-butoxy group, an n-pentyloxy group, an n-hexyloxy group, a 2-ethylhexyloxy group, an n-octyloxy group, an n-decyloxy group, an n-dodecyloxy group, an n-tetradecyloxy group, an n-octadecyloxy group, a cyclopentyloxy group, a cyclohexyloxy group, a 4-tert-butylcyclohexyloxy group, a cycloheptyloxy group, a cyclooctyloxy group, a cyclohexylmethoxy group, a cyclohexylethoxy group, a 2-methoxyethoxy group, a 2-ethoxyethoxy group, a 2-n-butoxyethoxy group, a 3-methoxypropoxy group, a 3-ethoxypropoxy group, a 3-n-propoxypropoxy group, a 3-n-butoxypropoxy group, a 3-n-hexyloxypropoxy group, a 2-methoxyethoxyethoxy group, a 2-phenoxymethoxy group, a 2-phenoxyethoxyethoxy group, a chloromethoxy group, a 2-chloroethoxy group, a 3-chloropropoxy group, a 2,2,2-trichloroethoxy group, a nitro group, a fluorine atom, a chlorine atom, a bromine atom, an iodine atom, etc.

The substituents $R_1$ and $R_3$ are preferably an unsubstituted linear or branched alkyl group having 1-10 carbon atoms, an unsubstituted linear or branched alkoxy group having 1-10 carbon atoms, or a chlorine atom, more preferably a methyl group, an ethyl group, an n-propyl group, an isopropyl group, an n-butyl group, an isobutyl group, a tert-butyl group, a methoxy group, an ethoxy group, an n-propoxy group, an isopropoxy group, an n-butoxy group, an isobutoxy group, a tert-butoxy group, or a chlorine atom. A methyl group or a chlorine atom is particularly preferred as the substituents $R_1$ and $R_3$. In the structural unit represented by the general formula (1), $R_2$ is a hydrogen atom or a methyl group.

In the structural units represented by the general formulas (1) and (2), k and l are each independently an integer of 0-3, preferably 0, 1 or 2, more preferably 0 or 1. The integer zero is particularly preferred as k and l. In the structural unit represented by the general formula (1), m and n are each independently an integer of 0-20, preferably an integer of 0-10, more preferably an integer of 0-5, even more preferably an integer of 0-2. The integer one is particularly preferred as m and n. It should however be noted that at least one of m and n is other than zero.

In the structural units represented by the general formulas (1) and (2), the carbonate bond or the position of a substituent containing the carbonate bond is positioned on the benzene ring within the spirobiindan structure either at 4, 5, 6 or 7 position or at 4', 5', 6' or 7' position, respectively.

Among the structural units represented by the general formula (1), the one that is represented by the following formula (1A) is particularly preferred; among the structural units represented by the general formula (2), the one that is represented by the following formula (2A) is particularly preferred:

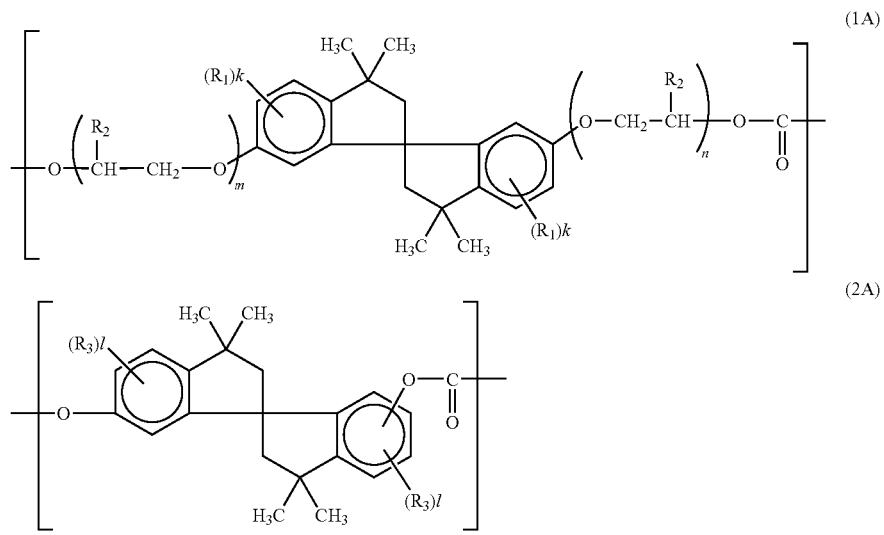

where $R_1$, $R_2$, $R_3$, k, l, m and n have the same meanings as defined above.

The polycarbonate copolymer (A) can be obtained by causing a carbonate precursor to act on a dihydroxy compound represented by the following general formula (1a) and a dihydroxy compound represented by the following general formula (2a) so that they are copolymerized. Namely, the structural unit represented by the general formula (1) can be derived from the compound represented by the following general formula (1a) and the carbonate precursor. On the other hand, the structural unit represented by the general formula (2) can be derived from the compound represented by the following general formula (2a) and the carbonate precursor.

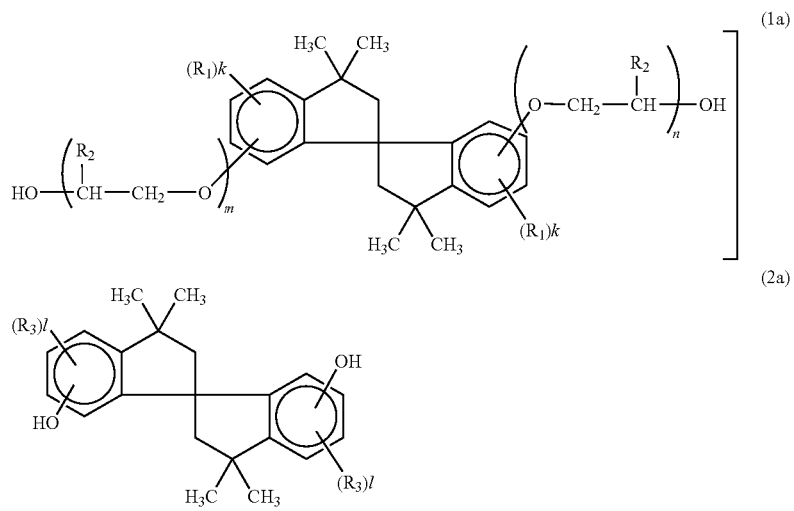
where $R_1$, $R_2$, $R_3$, k, l, m and n have the same meanings as defined above.
The dihydroxy compound represented by the general formula (1a) which is one of the main starting materials for the polycarbonate copolymer (A) may be exemplified by the following dihydroxy compounds, which are by no means limiting:
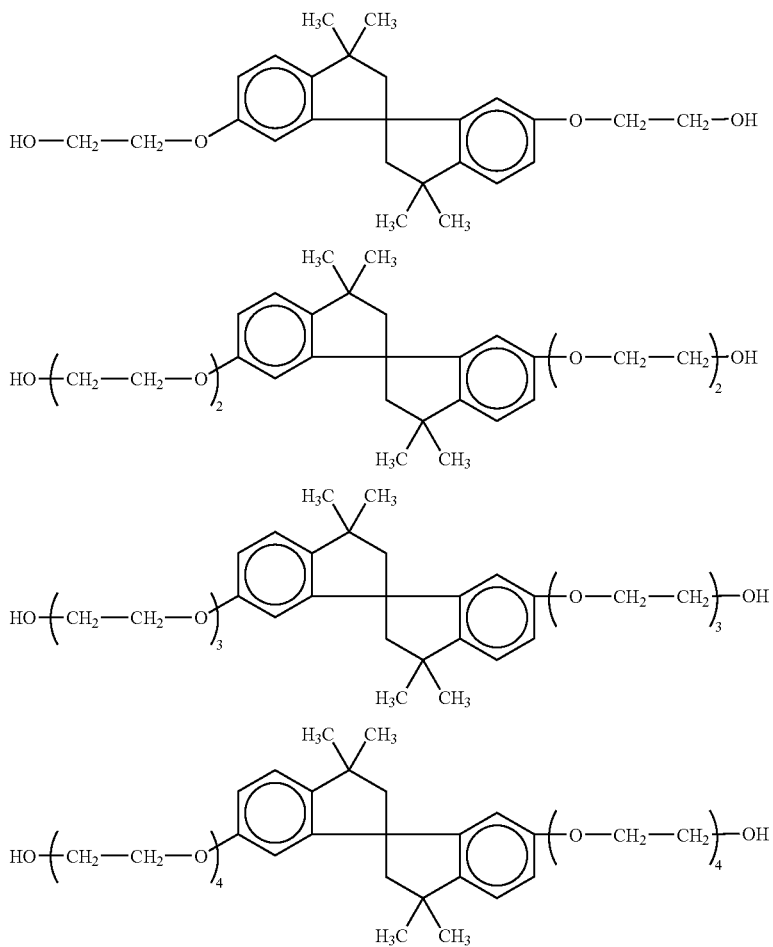

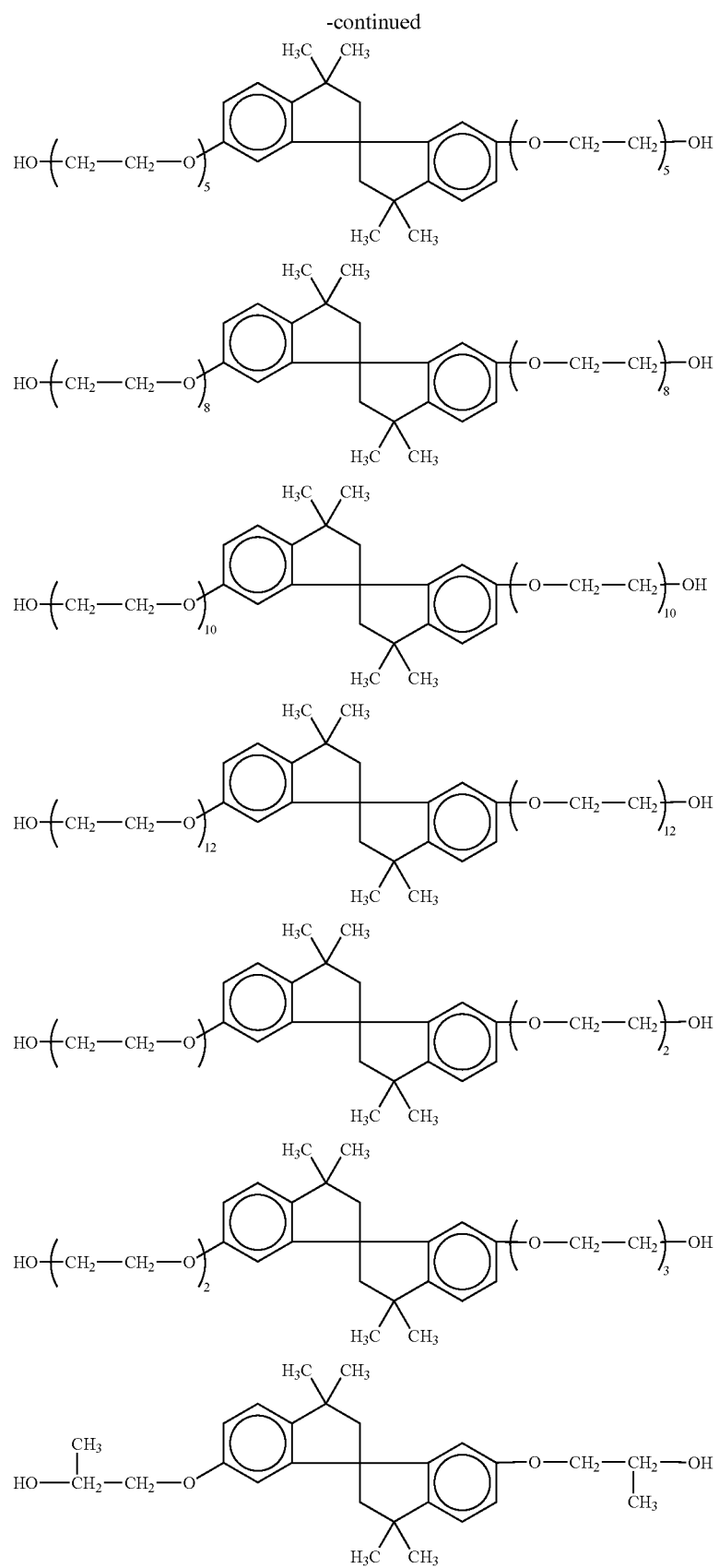

-continued
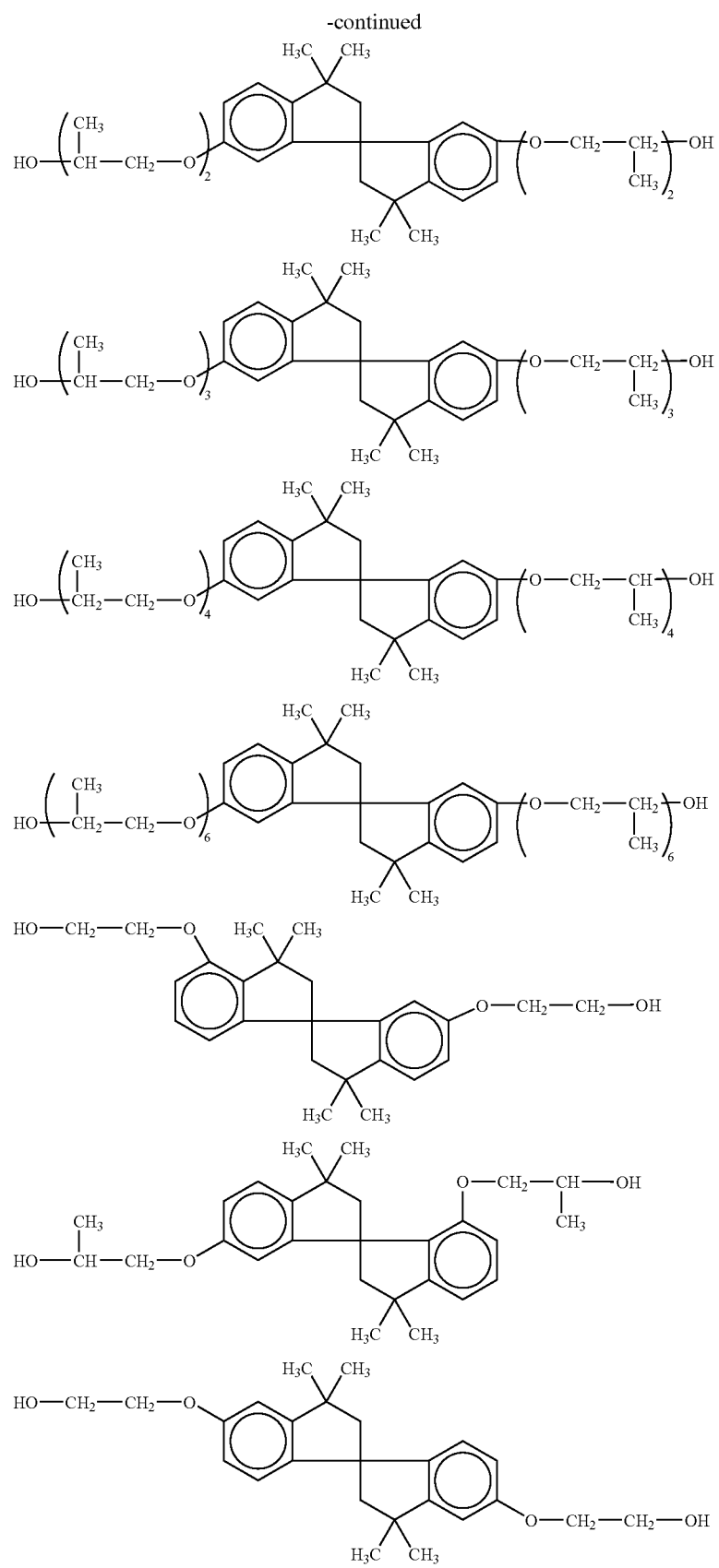

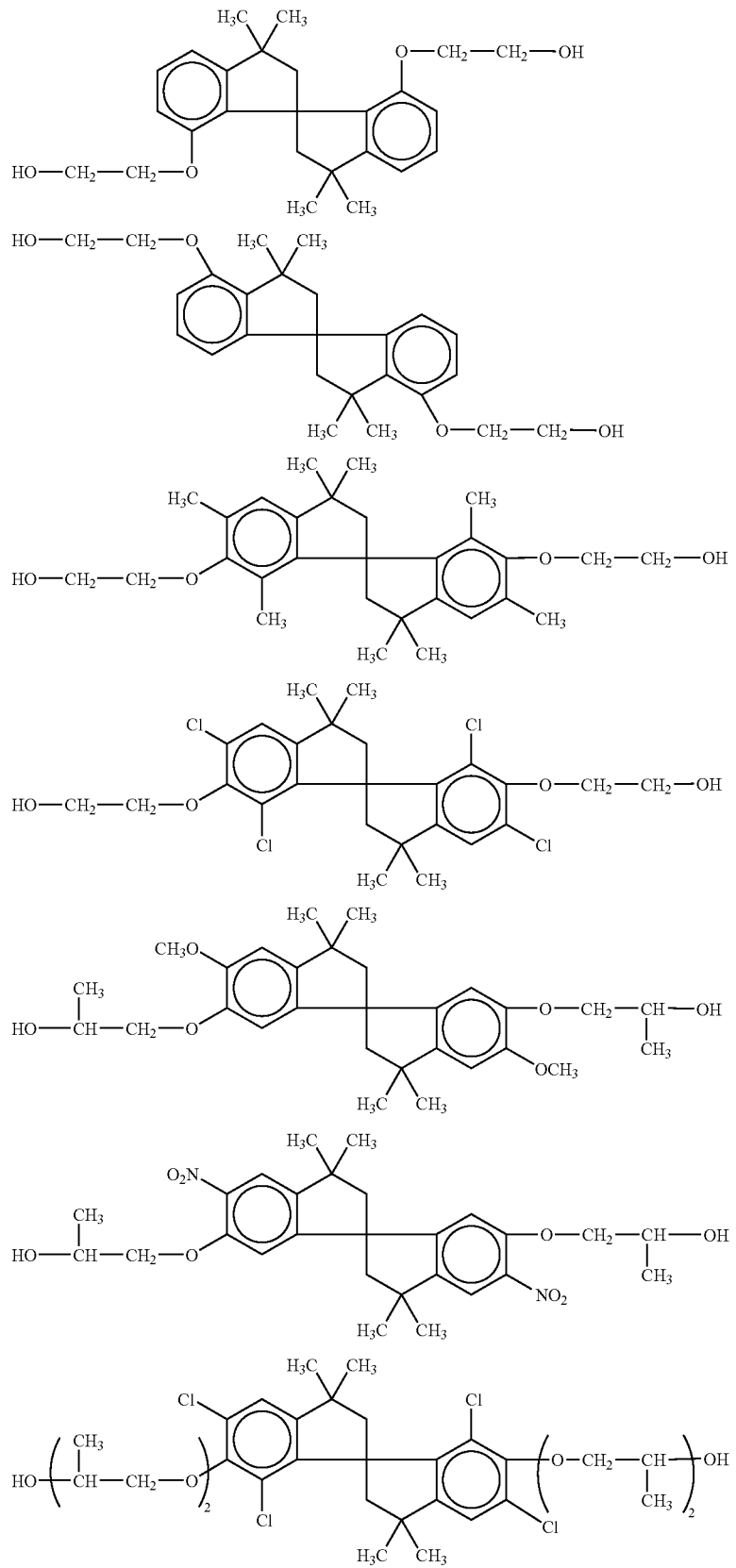

The dihydroxy compound represented by the general formula (2a) which is the other main starting material may be exemplified by the following dihydroxy compounds, which are by no means limiting:. 6,6'-dihydroxy-3,3,3',3'-tetramethyl-1,1'-spirobiindan, 6,6'-dihydroxy-3,3,3',3',5,5'-hexamethyl-1,1'-spirobiindan, 6,6'-dihydroxy-5,5'-diethyl-3,3,3',3'-tetramethyl-1,1'-spirobiindan, 6,6'-dihydroxy-5,5'-di-n-propyl-3,3,3',3'-tetramethyl-1,1'-spirobiindan, 6,6'-dihydroxy-5,5'-diisopropyl-3,3,3',3'-tetramethyl-1,1'-spirobiindan, 6,6'-dihydroxy-5,5'-di-n-butyl-3,3,3',3'-tetramethyl-1,1'-spirobiindan, 6,6'-dihydroxy-5,5'-di-tert-butyl-3,3,3',3'-tetramethyl-1,1'-spirobiindan, 6,6'-dihydroxy-5,5'-di-n-pentyl-3,3,3',3'-tetramethyl-1,1'-spirobiindan, 6,6'-dihydroxy-5,5'-di-isopentyl-3,3,3',3'-tetramethyl-1,1'-spirobiindan, 6,6'-dihydroxy-5,5'-di-n-hexyl-3,3,3',3'-tetramethyl-1,1'-spirobiindan, 6,6'-dihydroxy-5,5'-di-n-octyl-3,3,3',3'-tetramethyl-1,1'-spirobiindan, 6,6'-dihydroxy-5,5'-di-(2-ethylhexyl)-3,3,3',3'-tetramethyl-1,1'-spirobiindan, 6,6'-dihydroxy-5,5'-di-n-nonyl-3,3,3',3'-tetramethyl-1,1'-spirobiindan, 6,6'-dihydroxy-5,5'-di-n-decyl-3,3,3',3'-tetramethyl-1,1'-spirobiindan, 6,6'-dihydroxy-5,5'-di-n-dodecyl-3,3,3',3'-tetramethyl-1,1'-spirobiindan, 6,6'-dihydroxy-5,5'-di-n-undecyl-3,3,3',3'-tetramethyl-1,1'-spirobiindan, 6,6'-dihydroxy-5,5'-di-n-octadecyl-3,3,3',3'-tetramethyl-1,1'-spirobiindan, 6,6'-dihydroxy-5,5'-dicyclopentyl-3,3,3',3'-tetramethyl-1,1'-spirobiindan, 6,6'-dihydroxy-5,5'-dicyclohexyl-3,3,3',3'-tetramethyl-1,1'-spirobiindan, 6,6'-dihydroxy-5,5'-dicycloheptyl-3,3,3',3'-tetramethyl-1,1'-spirobiindan, 6,6'-dihydroxy-5,5'-dicyclooctyl-3,3,3',3'-tetramethyl-1,1'-spirobiindan, 6,6'-dihydroxy-5,5'-di(4-methylcyclohexyl)-3,3,3',3'-tetramethyl-1,1'-spirobiindan, 6,6'-dihydroxy-5,5'-di(4-tert-butylcyclohexyl)-3,3,3',3'-tetramethyl-1,1'-spirobiindan, 6,6'-dihydroxy-5,5'-dicyclohexylmethyl-3,3,3',3'-tetramethyl-1,1'-spirobiindan, 6,6'-dihydroxy-5,5'-dicyclohexylethyl-3,3,3',3'-tetramethyl-1,1'-spirobiindan, 6,6'-dihydroxy-5,5'-ditetrahydrofurfuryl-3,3,3',3'-tetramethyl-1,1'-spirobiindan, 6,6'-dihydroxy-5,5'-di(2-methoxyethyl)-3,3,3',3'-tetramethyl-1,1'-spirobiindan, 6,6'-dihydroxy-5,5'-di(2-ethoxyethyl)-3,3,3',3'-tetramethyl-1,1'-spirobiindan, 6,6'-dihydroxy-5,5'-di(2-n-butoxyethyl)-3,3,3',3'-tetramethyl-1,1'-spirobiindan, 6,6'-dihydroxy-5,5'-di(3-methoxypropyl)-3,3,3',3'-tetramethyl-1,1'-spirobiindan, 6,6'-dihydroxy-5,5'-di(3ethoxypropyl)-3,3,3',3'-tetramethyl-1,1'-spirobiindan, 6,6'-dihydroxy-5,5'-di(3-n-butoxypropyl)-3,3,3',3'-tetramethyl-1,1'-spirobiindan, 6,6'-dihydroxy-5,5'-di(3-n-hexyloxypropyl)-3,3,3',3'-tetramethyl-1,1'-spirobiindan, 6,6'-dihydroxy-5,5'-di(2-methoxyethoxyethyl)-3,3,3',3'-tetramethyl-1,1'-spirobiindan, 6,6'-dihydroxy-5,5'-di(2-ethoxyethoxyethyl)-3,3,3',3'-tetramethyl-1,1'-spirobiindan, 6,6'-dihydroxy-5,5'-di(2-phenoxymethyl)-3,3,3',3'-tetramethyl-1,1'-spirobiindan, 6,6'-dihydroxy-5,5'-di(2-phenoxyethoxyethyl)-3,3,3',3'-tetramethyl-1,1'-spirobiindan, 6,6'-dihydroxy-5,5'-bischloromethyl-3,3,3',3'-tetramethyl-1,1'-spirobiindan, 6,6'-dihydroxy-5,5'-di(2-chloroethyl)-3,3,3',3'-tetramethyl-1,1'-spirobiindan, 6,6'-dihydroxy-5,5'-di(3-chloropropyl)-3,3,3',3'-tetramethyl-1,1'-spirobiindan, 6,6'-dihydroxy-5,5'-di(2,2,2-trichloroethyl)-3,3,3',3'-tetramethyl-1,1'-spirobiindan, 6,6'-dihydroxy-5,5'-dimethoxy-3,3,3',3'-tetramethyl-1,1'-spirobiindan, 6,6'-dihydroxy-5,5'-diisopropoxy-3,3,3',3'-tetramethyl-1,1'-spirobiindan, 6,6'-dihydroxy-5,5'-di-n-butoxy-3,3,3',3'-tetramethyl-1,1'-spirobiindan, 6,6'-dihydroxy-5,5'-di-n-hexyloxy-3,3,3',3'-tetramethyl-1,1'-spirobiindan, 6,6'-dihydroxy-5,5'-di-n-octyloxy-3,3,3',3'-tetramethyl-1,1'-spirobiindan, 6,6'-dihydroxy-5,5'-di-n-octadecyloxy-3,3,3',3'-tetramethyl-1,1'-spirobiindan, 6,6'-dihydroxy-5,5'-dicyclohexyloxy-3,3,3',3'-tetramethyl-1,1'-spirobiindan, 6,6'-dihydroxy-5,5'-di(4-tert-butylcyclohexyloxy)-3,3,3',3'-tetramethyl-1,1'-spirobiindan, 6,6'-dihydroxy-5,5'-dicyclohexylmethyloxy-3,3,3',3'-tetramethyl-1,1'-spirobiindan, 6,6'-dihydroxy-5,5'-dicyclohexylethyloxy-3,3,3',3'-tetramethyl-1,1'-spirobiindan, 6,6'-dihydroxy-5,5'-di(2-methoxyethoxy)-3,3,3',3'-tetramethyl-1,1'-spirobiindan, 6,6'-dihydroxy-5,5'-di(2-ethoxyethoxy)-3,3,3',3'-tetramethyl-1,1'-spirobiindan, 6,6'-dihydroxy-5,5'-di(2-n-butoxyethoxy)-3,3,3',3'-tetramethyl-1,1'-spirobiindan, 6,6'-dihydroxy-5,5'-di(3-methoxypropoxy)-3,3,3',3'-tetramethyl-1,1'-spirobiindan, 6,6'-dihydroxy-5,5'-di(3-ethoxypropoxy)-3,3,3',3'-tetramethyl-1,1'-spirobiindan, 6,6'-dihydroxy-5,5'-di(3-n-butoxypropoxy)-3,3,3',3'-tetramethyl-1,1'-spirobiindan, 6,6'-dihydroxy-5,5'-di(3-n-hexyloxypropoxy)-3,3,3',3'-tetramethyl-1,1'-spirobiindan, 6,6'-dihydroxy-5,5'-di(2-methoxyethoxyethoxy)-3,3,3',3'-tetramethyl-1,1'-spirobiindan, 6,6'-dihydroxy-5,5'-di(2-ethoxyethoxyethoxy)-3,3,3',3'-tetramethyl-1,1'-spirobiindan, 6,6'-dihydroxy-5,5'-di(2-phenoxymethoxy)-3,3,3',3'-tetramethyl-1,1'-spirobiindan, 6,6'-dihydroxy-5,5'-di(2-phenoxyethoxy)-3,3,3',3'-tetramethyl-1,1'-spirobiindan, 6,6'-dihydroxy-5,5'-di(2-phenoxyethoxyethoxy)-3,3,3',3'-tetramethyl-1,1'-spirobiindan, 6,6'-dihydroxy-5,5'-di(2-chloroethoxy)-3,3,3',3'-tetramethyl-1,1'-spirobiindan, 6,6'-dihydroxy-5,5'-di(3-chloropropoxy)-3,3,3',3'-tetramethyl-1,1'-spirobiindan, 6,6'-dihydroxy-5,5'-di(2,2,2-trichloroethoxy)-3,3,3',3'-tetramethyl-1,1'-spirobiindan, 6,6'-dihydroxy-5,5'-dinitro-3,3,3',3'-tetramethyl-1,1'-spirobiindan, 6,6'-dihydroxy-5,5'-difluoro-3,3,3',3'-tetramethyl-1,1'-spirobiindan, 6,6'-dihydroxy-5,5'-dichloro-3,3,3',3'-tetramethyl-1,1'-spirobiindan, 6,6'-dihydroxy-5,5'-dibromo-3,3,3',3'-tetramethyl-1,1'-spirobiindan, 6,6'-dihydroxy-5,5'-diiodo-3,3,3',3'-tetramethyl-1,1'-spirobiindan, 6,6'-dihydroxy-3,3,3',3',4,4'-hexamethyl-1,1'-spirobiindan, 6,6'-dihydroxy-4,4'-dimethoxy-3,3,3',3'-tetramethyl-1,1'-spirobiindan, 6,6'-dihydroxy-4,4'-dinitro-3,3,3',3'-tetramethyl-1,1'-spirobiindan, 6,6'-dihydroxy-4,4'-dichloro-3,3,3',3'-tetramethyl-1,1'-spirobiindan, 6,6'-dihydroxy-3,3,3',3',7,7'-hexamethyl-1,1'-spirobiindan, 6,6'-dihydroxy-7,7'-dimethoxy-3,3,3',3'-tetramethyl-1,1'-spirobiindan, 6,6'-dihydroxy-7,7'-dinitro-3,3,3',3'-tetramethyl-1,1'-spirobiindan, 6,6'-dihydroxy-7,7'-dichloro-3,3,3',3'-tetramethyl-1,1'-spirobiindan, 6,6'-dihydroxy-3,3,3',3',5,5',7,7'-octamethyl-1,1'-spirobiindan, 6,6'-dihydroxy-5,5',7,7'-tetrachloro-3,3,3',3'-tetramethyl-1,1'-spirobiindan, 6,6'-dihydroxy-7,7'-dichloro-3,3,3',3',5,5'-hexamethyl-1,1'-spirobiindan, 6,6'-dihydroxy-4,4',5,5',7,7'-hexachloro-3,3,3',3'-tetramethyl-1,1'-spirobiindan, 4,4'-dihydroxy-3,3,3',3'-tetramethyl-1,1'-spirobiindan, 5,5'-dihydroxy-3,3,3',3'-tetramethyl-1,1'-spirobiindan, and 7,7'-dihydroxy-3,3,3',3'-tetramethyl-1,1'-spirobiindan.

Starting from the dihydroxy compound represented by the general formula (2a), the dihydroxy compound represented by the general formula (1a) may advantageously be produced by a method involving a reaction known per se. To be more specific, the dihydroxy compound represented by the general formula (1a) can be produced by reacting the dihydroxy compound of the general formula (2a) with an alkylene oxide such as ethylene oxide or propylene oxide, a cyclic alkylene carbonate such as ethylene carbonate or propylene carbonate, or a β-halohydrin such as 2-bromoethanol, 2-chloroethanol or 2-bromo-1-propanol. The dihydroxy compound of the general formula (2a) may advantageously be produced by a known method such as the one described in JP 62-10030 A and the like. For example, it can be obtained by heating bisphenol A in the presence of an acid catalyst.

The polycarbonate copolymer (A) is produced by a variety of known methods for polymerizing polycarbonates. Exemplary methods include those described in "JIKKEN KAGAKU KOZA (A Course in Experimental Chemistry)", 4th ed. (28) Kobunshi Gosei (Polymer Syntheses), pp. 231-242, Maruzen Publishing Company (1988), for example, solution polymerization, transesterification and interfacial polymerization. Typically, the polycarbonate copolymer (A) may advantageously be produced by causing a carbonate precursor (for example, a carbonic diester compound such as dimethyl carbonate, diethyl carbonate or diphenyl carbonate, or a halogenated carbonyl compound such as phosgene) to act on the dihydroxy compound of the general formula (1a) and the dihydroxy compound of the general formula (2a).

Solution polymerization is a process in which the abovementioned dihydroxy compounds are reacted with a halogenated carbonyl compound (e.g. phosgene) in an organic solvent in the presence of an organic base such as pyridine. Interfacial polymerization is a process in which the dihydroxy compounds are reacted with a halogenated carbonyl compound under interfacial conditions comprising an aqueous solution of an alkali metal base or an alkaline earth metal base and an organic solvent (for example, an aliphatic halogenated hydrocarbon such as dichloromethane, chloroform, 1,2-dichloroethane, 1,2-dichloroethylene, trichloroethane, tetrachloroethane or dichloropropane, or an aromatic halogenated hydrocarbon such as chlorobenzene or dichlorobenzene, or mixtures thereof), to effect polycondensation, optionally in the presence of a catalyst (e.g. triethylamine) and a molecular weight regulator. Transesterification is a process in which the aforementioned dihydroxy compounds and a carbonic diester compound (e.g. dimethyl carbonate, diethyl carbonate or diphenyl carbonate) are reacted in a molten state or in solution under heating, optionally in the presence of a catalyst.

The polycarbonate copolymer (A) is not limited in any particular way as long as it is a polycarbonate copolymer comprising the structural unit represented by the above general formula (1) and the structural unit represented by the above general formula (2). Hence, it may be either a random copolymer or an alternating copolymer or a block copolymer. In the case of producing the polycarbonate copolymer (A) as a random copolymer, the dihydroxy compounds represented by the general formulas (1a) and (2a) are mixed and a carbonate precursor is allowed to act on the resulting mixture of the dihydroxy compounds. In the case of producing the polycarbonate copolymer (A) as an alternating copolymer, the dihydroxy compound represented by either the general formula (1a) or the general formula (2a) and a carbonate precursor are used to make a monomeric intermediate terminated with a haloformate group or a carbonic ester group and this intermediate is reacted with the other dihydroxy compound. In the case of producing the polycarbonate copolymer (A) as a block copolymer, the dihydroxy compound represented by either the general formula (1a) or the general formula (2a) is independently reacted with a carbonate precursor to prepare a polycarbonate oligomer in which the greater part of end terminals is a haloformate group or a carbonic ester group and, thereafter, this polycarbonate oligomer is reacted with the other dihydroxy compound or a polycarbonate oligomer derived from that dihydroxy compound.

The polycarbonate copolymer (A) may contain plural structural units being different from each other as the structural unit represented by the general formula (1). The polycarbonate copolymer (A) may contain plural structural units being different from each other as the structural unit represented by the general formula (2).

Considering the balance which the polycarbonate copolymer (A) desirably presents between physical properties including heat resistance and mechanical properties, the proportion of the structural units of the general formulas (1) and (2) that is occupied by the structural unit of the general formula (1) is preferably 5-90 mol %, more preferably 10-80 mol %, and even more preferably 20-70 mol %.

The polycarbonate copolymer (A) may contain structural units other than those represented by the general formulas (1) and (2). If it contains other structural units, the proportion of the total structural units that is occupied by those represented by the general formulas (1) and (2) is not limited to any particular value as long as it is within the range that is not detrimental to the desired effects of the present invention; usually, it is at least 50 mol %, preferably at least 70 mol %, and more preferably at least 90 mol %. In order to maximize the desired effects of the present invention, it is particularly preferred that the polycarbonate copolymer (A) is solely composed of the structural units represented by the general formulas (1) and (2).

Such structural units other than those represented by the general formulas (1) and (2) are repeating structural units derived from dihydroxy compounds other than those represented by the general formula (1a) or (2a) and such other dihydroxy compounds may be exemplified by a variety of known aromatic dihydroxy compounds or aliphatic dihydroxy compounds.

Specific examples of such aromatic dihydroxy compounds include: bis(hydroxyaryl)alkanes such as bis(4-hydroxyphenyl)methane, 1,1-bis(4'-hydroxyphenyl)ethane, 1,2-bis(4'-hydroxyphenyl)ethane, bis(4-hydroxyphenyl)phenylmethane, bis(4-hydroxyphenyl)diphenylmethane, bis(4-hydroxyphenyl)-1-naphthylmethane, 1,1-bis(4'-hydroxyphenyl)-1-phenylethane, 2,2-bis(4'-hydroxyphenyl)propane [bisphenol A], 2-(4'-hydroxyphenyl)-2-(3'-hydroxyphenyl)propane, 2,2-bis(4'-hydroxyphenyl)butane, 1,1-bis(4'-hydroxyphenyl)butane, 2,2-bis(4'-hydroxyphenyl)-3-methylbutane, 2,2-bis(4'-hydroxyphenyl)pentane, 3,3-bis(4'-hydroxyphenyl)pentane, 2,2-bis(4'-hydroxyphenyl)hexane, 2,2-bis(4'-hydroxyphenyl)octane, 2,2-bis(4'-hydroxyphenyl)-4-methylpentane, 2,2-bis(4'-hydroxyphenyl)heptane, 4,4-bis(4'-hydroxyphenyl)heptane, 2,2-bis(4'-hydroxyphenyl)tridecane, 2,2-bis(4'-hydroxyphenyl)octane, 2,2-bis(3'-methyl-4'-hydroxyphenyl)propane, 2,2-bis(3'-ethyl-4'-hydroxyphenyl)propane, 2,2-bis(3'-n-propyl-4'-hydroxyphenyl)propane, 2,2-bis(3'-isopropyl-4'-hydroxyphenyl)propane, 2,2-bis(3'-sec-butyl-4'-hydroxyphenyl)propane, 2,2-bis(3'-tert-butyl-4'-hydroxyphenyl)propane, 2,2-bis(3'-tert-butyl-4'-hydroxyphenyl)propane, 2,2-bis(3'-cyclohexyl-4'-hydroxyphenyl)propane, 2,2-bis(3'-allyl-4'-hydroxyphenyl)propane 2,2-bis(3'-methoxy-4'-hydroxyphenyl)propane, 2,2-bis(3',5'-dimethyl-4'-hydroxyphenyl)propane, 2,2-bis(2',3',5',6'-tetramethyl-4'-hydroxyphenyl)propane, bis(4-hydroxyphenyl)cyanomethane, 1-cyano-3,3-bis(4'-hydroxyphenyl)butane, 2,2-bis(4'-hydroxyphenyl)hexafluoropropane, etc.; bis(hydroxyaryl)cycloalkanes such as 1,1-bis(4'-hydroxyphenyl)cyclopentane, 1,1-bis(4'-hydroxyphenyl)cyclohexane, 1,1-bis(4'-hydroxyphenyl)cycloheptane, 1,1-bis(3'-methyl-4'-hydroxyphenyl)cyclohexane, 1,1-bis(3',5'-dimethyl-4'-hydroxyphenyl)cyclohexane, 1,1-bis(3',5'-dichloro-4'-hydroxyphenyl)cyclohexane, 1,1-bis(3'-methyl-4'-hydroxyphenyl)-4-methylcyclohexane, 1,1-bis(4'-hydroxyphenyl)-3,3,5-trimethylcyclohexane, 2,2-bis(4'-hydroxyphenyl)norbornane, 2,2-bis(4'-hydroxyphenyl)

adamantane, etc.; bis(hydroxyaryl)ethers such as 4,4'-dihydroxydiphenyl ether, 4,4'-dihydroxy-3,3'-dimethyldiphenyl ether, ethylene glycol bis(4-hydroxyphenyl)ether, etc.; bis(hydroxyaryl)sulfides such as 4,4'-dihydroxydiphenyl sulfide, 3,3'-dimethyl-4,4'-dihydroxydiphenyl sulfide, 3,3'-dicyclohexyl-4,4'-dihydroxydiphenyl sulfide, 3,3'-diphenyl-4,4'-dihydroxydiphenyl sulfide, etc.; bis(hydroxyaryl)sulfoxides such as 4,4'-dihydroxydiphenyl sulfoxide, 3,3'-dimethyl-4,4'-dihydroxydiphenyl sulfoxide, etc.; bis(hydroxyaryl)sulfones such as 4,4'-dihydroxydiphenyl sulfone, 4,4'-dihydroxy-3,3'-dimethyldiphenyl sulfone, etc.; bis(hydroxyaryl)ketones such as bis(4-hydroxyphenyl)ketone, bis(4-hydroxy-3-methylphenyl)ketone, etc.; as well as 7,7'-dihydroxy-3,3',4,4'-tetrahydro-4,4,4',4'-tetramethyl-2,2'-spirobi(2H-1-benzopyran), trans-2,3-bis(4'-hydroxyphenyl)-2-butene, 9,9-bis(4'-hydroxyphenyl)fluorene, 3,3-bis(4'-hydroxyphenyl)-2-butanone, 1,6-bis(4'-hydroxyphenyl)-1,6-hexanedione, (α,α,α',α'-tetramethyl-α,α'-bis(4-hydroxyphenyl)-p-xylene, α,α,α',α'-tetramethyl-α,α'-bis(4-hydroxyphenyl)-m-xylene, 4,4'-dihydroxybiphenyl, hydroquinone, resorcin, etc. Also useful are aromatic dihydroxy compounds containing an ester bond that can be produced by reacting, for example, 2 moles of bisphenol A with 1 mole of isophthaloyl chloride or terephthaloyl chloride.

Specific examples of the above-mentioned aliphatic dihydroxy compounds include: dihydroxyalkanes such as 1,2-dihydroxyethane, 1,3-dihydroxypropane, 1,4-dihydroxybutane, 1,5-dihydroxypentane, 3-methyl-1,5-dihydroxypentane, 1,6-dihydroxyhexane, 1,7-dihydroxyheptane, 1,8-dihydroxyoctane, 1,9-dihydroxynonane, 1,10-dihydroxydecane, 1,11-dihydroxyundecane, 1,12-dihydroxydodecane, dihydroxyneopentyl, 2-ethyl-1,2-dihydroxyhexane, 2-methyl-1,3-dihydroxypropane, etc.; and dihydroxycycloalkanes such as 1,3-dihydroxycyclohexane, 1,4-dihydroxycyclohexane, 2,2-bis(4'-hydroxylcyclohexyl)propane, etc.

Further examples are dihydroxy compounds such as o-dihydroxyxylylene, m-dihydroxyxylylene, p-dihydroxyxylylene, 1,4-bis(2'-hydroxyethyl)benzene, 1,4-bis(3'-hydroxypropyl)benzene, 1,4-bis(4'-hydroxybutyl)benzene, 1,4-bis(5'-hydroxypentyl)benzene, 1,4-bis(6'-hydroxyhexyl)benzene, 2,2-bis[4'-(2"-hydroxyethyloxy)phenyl]propane, etc.

Furthermore, structural units derived from bifunctional compounds other than the dihydroxy compounds listed above may also be contained as structural units other than those represented by the general formulas (1) and (2). To be more specific, bifunctional compounds other than said dihydroxy compounds may include such compounds as aromatic dicarboxylic acids, aliphatic dicarboxylic acids, aromatic diamines, aliphatic diamines, aromatic diisocyanates, and aliphatic diisocyanates. Using these bifunctional compounds, one can obtain polycarbonate copolymers containing not only the carbonate group but also other groups such as an imino group, an ester group, an ether group, an imide group, an amide group, a urethane group, a urea group, etc. The present invention encompasses such polycarbonate copolymers.

In the polycarbonate copolymer (A), the terminal groups may be reactive ones such as a hydroxyl group, a haloformate group, a carbonic ester group, etc.; alternatively, they may be inert terminal groups capped with a molecular weight regulator to be described later. The amount of the terminal groups within the polycarbonate copolymer (A) is not limited to any particular value but it is typically between 0.001 and 10 mol %, preferably between 0.01 and 5 mol %, more preferably between 0.1 and 3 mol %, based on the total number of moles of the structural units.

Details will follow but in the optical unit of the present invention, the intrinsic viscosity of the low Abbe number lens material is preferably between 0.25 and 0.50, more preferably between 0.25 and 0.35. Therefore, the polycarbonate copolymer (A) preferably has an intrinsic viscosity within the stated ranges.

To this end, the polycarbonate copolymer (A) has a mass average molecular weight between 5,000 and 200,000, preferably between 10,000 and 150,000, more preferably between 15,000 and 120,000, as calculated for the standard polystyrene by GPC (gel permeation chromatography). The polydispersity index, expressed as the ratio between mass average molecular weight and number average molecular weight, of the polycarbonate copolymer (A) is not limited to any particular value but is preferably between 1.5 and 20.0, more preferably between 2.0 and 15.0, and even more preferably between 2.0 and 10.0.

In order to obtain the polycarbonate copolymer (A) whose mass average molecular weight and polydispersity index are within the stated ranges, the making of the polycarbonate copolymer (A) in accordance with the methods described above is preferably done by performing polymerization in the presence of a molecular weight regulator for the specific purpose of regulating the molecular weight. Such molecular weight regulator is not limited in any particular way and a variety of known molecular weight regulators that are used in known polycarbonate polymerization processes will do; examples include monovalent hydroxy aliphatic compounds or hydroxy aromatic compounds or their derivatives (e.g., alkali metal salts or alkaline earth metal salts of monovalent hydroxy aliphatic compounds or hydroxy aromatic compounds, haloformate compounds of monovalent hydroxy aliphatic compounds or hydroxy aromatic compounds, and carbonic esters of monovalent hydroxy aliphatic compounds or hydroxy aromatic compounds), as well as monovalent carboxylic acids or their derivatives (e.g., alkali metal salts or alkaline earth metal salts of monovalent carboxylic acids, acid halides of monovalent carboxylic acids, and esters of monovalent carboxylic acids).

Examples of the above-mentioned monovalent hydroxy aliphatic compounds or hydroxy aromatic compounds include methanol, ethanol, butanol, octanol, lauryl alcohol, methoxyethanol, propylene glycol monomethyl ether, cyclohexanol, benzyl alcohol, allyl alcohol, phenol, p-tert-butylphenol, 2-cresol, 3-cresol, 4-cresol, 2-ethylphenol, 4-ethylphenol, 4-cumylphenol, 4-phenylphenol, 4-cyclohexylphenol, 4-n-octylphenol, 4-isooctylphenol, 4-nonylphenol, 4-methoxyphenol, 4-n-hexyloxyphenol, 4-isopropenylphenol, 2-chlorophenol, 3-chlorophenol, 4-chlorophenol, 2-bromophenol, 3-bromophenol, 4-bromophenol, 2,4-dichlorophenol, 2,4-dibromophenol, pentachlorophenol, pentabromophenol, β-naphthol, α-naphthol, 2-(4'-methoxyphenyl)-2-(4"-hydroxyphenyl)propane, etc.

Examples of the above-mentioned monovalent carboxylic acids include aliphatic carboxylic acids such as acetic acid, propionic acid, butyric acid, valeric acid, caproic acid, heptanoic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 2,4-dimethylvaleric acid, 3,5-dimethylcaproic acid, phenoxyacetic acid, etc., and benzoic acids such as benzoic acid, 4-propoxybenzoic acid, 4-butoxybenzoic acid, 4-pentyloxybenzoic acid, 4-hexyloxybenzoic acid, 4-octyloxybenzoic acid, etc.

Among the molecular weight regulators listed above, phenol and p-tert-butylphenol are preferred.

In order to obtain the polycarbonate copolymer (A) having an intrinsic viscosity within the stated ranges, the molecular weight regulator is added in an amount between 0.001 and 10 mol % in terms of molar ratio to the diol component. If phenol is used as the molecular weight regulator, it is preferably added in an amount between 0.01 and 5 mol % in terms of molar ratio to the diol component. If p-tert-butylphenol is used as the molecular weight regulator, it is preferably added in an amount between 0.01 and 10 mol % in terms of molar ratio to the diol component.

In the optical unit of the present invention, the low Abbe number lens material may contain an epoxy compound in addition to the polycarbonate copolymer (A). If this is the case, 0.0005-5 parts by mass of an epoxy compound is preferably contained for 100 parts by mass of the polycarbonate copolymer (A). More preferably, 0.001-3 parts by mass, even more preferably 0.01-2 parts by mass, of an epoxy compound may be contained per 100 parts by mass of the polycarbonate copolymer (A).

The epoxy compound that can be used with the polycarbonate copolymer (A) is a compound that contains an epoxy group (oxirane ring) and it may be either aromatic or aliphatic; if it is aliphatic, it may be linear, branched or cyclic. The epoxy compound may be substituted by a halogen atom, a carboxyl group, an alkylcarbonyl group, an alkoxycarbonyl group, an aminocarbonyl group, an alkylaminocarbonyl group, a hydroxyl group, an alkoxy group, a cyano group, a nitro group, an amino group, an aminoalkyl group, a sulfo group, etc. Among these substituents, two or more identical or different substituents may be contained in the molecule.

Such epoxy compounds include cyclohexene oxide compounds, cyclic epoxy compounds other than cyclohexene oxide, glycidyl ether compounds, carboxylic glycidyl ester compounds, epoxy resin compounds, epoxidized natural oils, and so forth.

Specific examples of the cyclohexene oxide compounds include cyclohexene oxide, 3,4-dimethyl-1,2-epoxycyclohexane, 3,5-dimethyl-1,2-epoxycyclohexane, 3-methyl-5-t-butyl-1,2-epoxycyclohexane, 4-vinyl-1-cyclohexene oxide, 4-vinyl-1-cyclohexene diepoxide, 2,6,6-trichloro-1,2-epoxycyclohexane, dipentene dioxide, 4,5-epoxy-anhydrous tetrahydrophthalic acid, 3-t-butyl-4,5-epoxy-anhydrous tetrahydrophthalic acid, 4,5-epoxytetrahydrophthalic diglycidyl ester, 4,5-epoxytetrahydrophthalic diethyl ester, 4,5-epoxytetrahydrophthalic di-n-butyl ester, 4,5-epoxytetrahydrophthalic di-2-ethylhexyl ester, 4,5-epoxytetrahydrophthalic isodecyl ester, bis(3,4-epoxy-6-methylcyclohexylmethyl)succinate, bis(3,4-epoxycyclohexylmethyl)adipate, bis(3,4-epoxy-6-methylcyclohexylmethyl)adipate, 3-(3,4-epoxycyclohexyl)-2',3'-epoxy-2,4-dioxaspiro(5.5)undecane, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, cyclohexylmethyl-3,4-epoxycyclohexyl carboxylate, cyclohexyl-2-methyl-3,4-epoxycyclohexyl carboxylate, octadecyl-3,4-epoxycyclohexyl carboxylate, 2-ethylhexyl-3',4'-epoxycyclohexyl carboxylate, octadecyl-2,2-dimethyl-3,4-epoxycyclohexyl carboxylate, 4-(3,4-epoxycyclohexyl)butyl-3',4'-epoxycyclohexyl carboxylate, 4-(3,4-epoxy-5-methylcyclohexyl)butyl-3',4'-epoxycyclohexyl carboxylate, 4-(3,4-epoxy-6-methylcyclohexyl)butyl-3',4'-epoxy-6'-methylcyclohexyl carboxylate, 3,4-epoxy-6-methylcyclohexylmethyl-6'-methylcyclohexyl carboxylate, etc.

Specific examples of the cyclic epoxy compounds other than cyclohexene oxide include cyclopentene oxide, cyclooctene oxide, cyclododecane epoxide, α-pinene oxide, exo-2,3-epoxynorbornane, 1,2,5,6-diepoxycyclooctane, limonene oxide, 3,4-epoxytricyclo[5.2.1.0$^{2.6}$]-decane, allyloxy-3,4-epoxytricyclo[5.2.1.0$^{2.6}$]-decane, 1,2-epoxy-5-trans-9-cis-cyclododecadiene, cedrene epoxide, 5,6-epoxy-4,7-methano-1-oxaspiro-[2,5]-octane, 1,4,4A,8A-tetrahydro-1,4-methanonaphthalene-5,8-dione-6,7-epoxide, cycloheptene oxide, 9-oxabicyclo[6.1.0]non-4-ene, cis-1,2-epoxycyclodecane, dicyclopentadiene dioxide, etc.

Specific examples of the glycidyl ether compounds include phenylglycidyl ether, glycidylbenzyl ether, glycidyl 2-methylphenyl ether, glycidyl 4-ethylphenyl ether, t-butylphenylglycidyl ether, glycidylmesityl ether, glycidyl-4-methoxyphenyl ether, 2-biphenylglycidyl ether, glycidyl 1-naphthyl ether, allylglycidyl ether, glycidylisopropyl ether, butylglycidyl ether, t-butylglycidyl ether, 2-ethylhexylglycidyl ether, glycidyllauryl ether, ethylene glycol diglycidyl ether, diethylene glycol diglycidyl ether, triethylene glycol diglycidyl ether, polyethylene glycol diglycidyl ether, propylene glycol diglycidyl ether, polypropylene glycol diglycidyl ether, 1,3-butanediol diglycidyl ether, 1,4-butanediol diglycidyl ether, hydroquinone diglycidyl ether, bisphenol A diglycidyl ether, tetramethyl bisphenol A diglycidyl ether, tetrabromobisphenol A diglycidyl ether, bisphenol F diglycidyl ether, bisphenol S diglycidyl ether, resorcinol diglycidyl ether, 4,4'-bis(2, 3-epoxypropoxy)biphenyl, 4,4'-bis(2,3-epoxypropoxy)-3,3', 5,5'-tetramethylbiphenyl, neopentyl alcohol diglycidyl ether, 1,6-hexanediol diglycidyl ether, glycerin diglycidyl ether, glycerin triglycidyl ether, trimethylolpropane polyglycidyl ether, sorbitol polyglycidyl ether, sorbitan polyglycidyl ether, pentaerythritol polyglycidyl ether, triglycidyl tris(2-hydroxyethyl)isocyanurate, glycidyllauryl ether, etc.

Specific examples of the carboxylic glycidyl ester compounds include diglycidyl adipate, diglycidyl o-phthalate, diglycidyl terephthalate, glycidyl phthalimide, glycidyl oleate, diglycidyl hexahydrophthalate, diglycidyl 4,5-cyclohexene-1,2-dicarboxylate, etc. Specific examples of the epoxy resin compounds include bisphenol A epoxy resins, novolak epoxy resins, o-cresol novolak epoxy resins, zylok epoxy resins, etc. Specific examples of the epoxidized natural oils include epoxidized soya oil, epoxidized linseed oil, epoxidized tall oil fatty acids esterified with 2-ethylhexyl, epoxidized (ethylene glycol-di-tall oil fatty acid esters), etc.

Other epoxy compounds include epoxybutyl stearate, epoxyoctyl stearate, 2-epoxyethylhexyl stearate, epoxybenzyl stearate, epoxyallyl stearate, bisepoxydicyclopentadienyl ether, 1,2-epoxybutane, 1,2-epoxyhexane, 1,2-epoxyoctane, 1,2-epoxydecane, 1,2-epoxydodecane, 1,2-epoxytetradecane, 1,2-epoxyhexadecane, 1,2-epoxyoctadecane, butadiene monoepoxide, butadiene diepoxide, 2-methyl-2-vinyloxirane, 1,2-epoxy-5-hexene, 1,2-epoxy-7-octene, 1,2,7,8-diepoxyoctane, tetraphenylethylene epoxide, epoxidized polybutadiene, glycidol, 2-methylglycidol, 3-propyloxirane methanol, styrene oxide, 2,3-epoxypropylbenzene, 1-phenylpropylene oxide, stilbene oxide, 4,5,9,10-diepoxy-1-decene, 1,2,4,5,9,10-triepoxydecane, 9,10-epoxyoctadecane, 2-epoxyethylbicyclo[2.2.1]heptane, 2-(benzyloxymethyl)-2-methyloxirane, etc.

Epoxy compounds that may be used in the low Abbe number lens material are preferably cyclohexene oxide compounds, cyclic epoxy compounds other than cyclohexene oxide, glycidyl ether compounds, carboxylic glycidyl ester compounds and epoxy resin compounds, more preferably cyclohexene oxide compounds, cyclic epoxy compounds other than cyclohexene oxide, glycidyl ether compounds and carboxylic glycidyl ester compounds, even more preferably cyclohexene oxide compounds and carboxylic glycidyl ester compounds, and most preferably cyclohexene oxide compounds. Among the cyclohexene oxide compounds, those without unsaturated bond are particularly preferred.

In the optical unit of the present invention, the low Abbe number lens material may contain a phosphite compound in addition to the polycarbonate copolymer (A). If this is the case, the low Abbe number lens material may contain the above-described epoxy compound and a phosphite compound at the same time; alternatively, it may contain only a phosphite compound.

In this case, the phosphite compound is preferably contained in an amount of 0.0005-5 parts by mass, more preferably 0.001-3 parts by mass, and even more preferably 0.01-2 parts by mass for 100 parts by mass of the polycarbonate copolymer (A).

A variety of known derivatives can be used as the phosphite compound to be contained in the low Abbe number lens material. Specific examples of the phosphite compound include but are not limited to the following: trialkyl phosphites such as trimethyl phosphite, triethyl phosphite, tributyl phosphite, trioctyl phosphite, tris(2-ethylhexyl phopshite), trinonyl phosphite, tridecyl phosphite, tris(tridecyl)phosphite, trioctadecyl phosphite, tristearyl phosphite, tris(2-chloroethyl)phosphite, tris(2,3-dichloropropyl phosphite), etc.; triscycloalkyl phosphites such as tricyclohexyl phosphite, etc.; trisaryl phosphites such as triphenyl phosphite, tricresyl phosphite, tris(ethylphenyl)phosphite, tris(2,4-di-t-butylphenyl)phosphite, tris(nonylphenyl)phosphite, etc.; arylalkyl phosphites such as phenyl-didecyl phosphite, diphenyl-isooctyl phosphite, diphenyl-2-ethylhexyl phosphite, diphenyl-decyl phosphite, diphenyl-tridecyl phosphite, etc.; diphosphites such as bis(tridecyl)-pentaerystyryl-diphosphite, distearyl-pentaerystyryl-diphosphite, diphenyl-pentaerystyryl-diphosphite, bis(nonylphenyl)-pentaerystyryl-diphosphite, bis(2,4-di-tert-butylphenyl)-pentaerystyryl-diphosphite, bis(2,6-di-tert-butyl-4-methylphenyl)-pentaerystyryl-diphosphite, tetraphenyl-dipropyleneglycol-diphosphite, tetra(tridecyl)-4,4'-isopropylidenediphenyl-diphosphite, etc.; tetra(2,4-di-tert-butylphenyl)-4,4'-diphenyl phosphite, tetraphenyltetra(tridecyl)pentaerystyryl tetraphosphite, trilauryl trithiophosphite, etc. These phosphite compounds may be used either singly or in combination of two or more kinds.

In the optical unit of the present invention, the low Abbe number lens material may contain an aliphatic compound in addition to the polycarbonate copolymer (A). If this is the case, the aliphatic compound is preferably contained in an amount of 0.0005-5 parts by mass, more preferably 0.001-3 parts by mass, and even more preferably 0.01-2 parts by mass for 100 parts by mass of the polycarbonate copolymer (A).

The aliphatic compound to be contained in the low Abbe number lens material is a compound that has an aliphatic chain but contains no aromatic group and the aliphatic chain may be linear, branched or cyclic. The aliphatic compound may be substituted by a halogen atom, a carboxyl group, an alkylcarbonyl group, an alkoxycarbonyl group, an aminocarbonyl group, an alkylaminocarbonyl group, a hydroxyl group, an alkoxy group, a cyano group, a nitro group, an amino group, an aminoalkyl group, a sulfo group, etc. Among these substituents, two or more identical or different substituents may be contained in the molecule. If the aliphatic compound has a substituent, the latter may form a salt with a metal.

Preferred aliphatic compounds include unsubstituted aliphatic compounds, or those which are substituted with a carboxyl group, an alkylcarbonyl group, an alkoxycarbonyl group, an aminocarbonyl group, an alkylaminocarbonyl group, a hydroxyl group, an alkoxy group, etc., and substituted aliphatic compounds in which the substituents form salts with metals. More preferred examples are compounds substituted with a carboxyl group, an alkylcarbonyl group, an alkoxycarbonyl group, an aminocarbonyl group, an alkylaminocarbonyl group, a hydroxyl group, an alkoxy group, etc., and substituted compounds in which the substituents form salts with metals. Preferred specific examples include aliphatic hydrocarbons, fatty acid compounds, fatty acid ester compounds, fatty acid metal salt compounds, fatty acid amide compounds, aliphatic alcohols, etc., with fatty acid compounds, fatty acid ester compounds, fatty acid metal salt compounds, fatty acid amide compounds and aliphatic alcohols being more preferred. Known compounds can be used as the aliphatic compounds.

Specific examples of aliphatic hydrocarbons include liquid paraffin, montan wax, beeswax, polyethylene of low polymerization degree, hydrogenated polybutene, etc. Specific examples of fatty acid compounds include linear saturated fatty acids, cyclic saturated fatty acids, branched saturated fatty acids, unsaturated fatty acids, unsaturated fatty acids having a hydroxyl group, etc. Linear saturated fatty acids of $C_6$-$C_{32}$ include, for example, caproic acid ($C_6$), enanthic acid ($C_7$), caprylic acid ($C_8$), pelargonic acid ($C_9$), capric acid ($C_{10}$), undecylic acid ($C_{11}$), lauric acid ($C_{12}$), tridecylic acid ($C_{13}$), myristic acid ($C_{14}$), pentadecylic acid ($C_{15}$), palmitic acid ($C_{16}$), heptadecylic acid ($C_{17}$), stearic acid ($C_{18}$), nonadecanoic acid ($C_{19}$), arachidic acid ($C_{20}$), henicosanoic acid ($C_{21}$), behenic acid ($C_{22}$), tricosenoic acid ($C_{23}$), lignoceric acid ($C_{24}$), pentacosanoic acid ($C_{25}$), cerotic acid ($C_{26}$), heptacosanoic acid ($C_{27}$), montanic acid ($C_{28}$), nonacosanoic acid ($C_{29}$), melissic acid ($C_{30}$), hentriacontanoic acid ($C_{31}$), and lacceric acid ($C_{32}$); cyclic saturated fatty acids include naphthenic acid, etc.; branched saturated fatty acids include 2-ethylhexoic acid, isodecanoic acid, etc.; unsaturated fatty acids include oleic acid, elaidic acid, cetoleic acid, erucic acid, brassidic acid, sorbic acid, linoleic acid, linolenic acid, arachidonic acid, etc.; unsaturated fatty acids having a hydroxyl group include ricinolic acid, etc.

Preferred fatty acid compounds are $C_{11}$-$C_{22}$ linear saturated fatty acids, naphthenic acid, oleic acid, erucic acid, sorbic acid, linoleic acid, linolenic acid, and ricinolic acid; more preferred are undecylic acid ($C_{11}$), lauric acid ($C_{12}$), tridecylic acid ($C_{13}$), myristic acid ($C_{14}$), palmitic acid ($C_{16}$), stearic acid ($C_{18}$), behenic acid ($C_{22}$), oleic acid, erucic acid, and sorbic acid; even more preferred are myristic acid ($C_{14}$), palmitic acid ($C_{16}$), stearic acid ($C_{18}$), and behenic acid ($C_{22}$); stearic acid ($C_{18}$) is particularly preferred.

Exemplary fatty acid ester compounds include ester compounds of the above-listed fatty acids and alcohols. The alcohols include $C_1$-$C_{22}$ linear monohydric alcohols and polyhydric alcohols; specific examples of $C_1$-$C_{22}$ linear monohydric alcohols include methanol, ethanol, propanol, butanol, pentyl alcohol, hexyl alcohol, heptyl alcohol, octyl alcohol, nonyl alcohol, decyl alcohol ($C_{10}$), undecyl alcohol ($C_{11}$), lauryl alcohol ($C_{12}$), tridecyl alcohol ($C_{13}$), myristyl alcohol ($C_{14}$), pentadecyl alcohol ($C_{15}$), cetyl alcohol ($C_{16}$), heptadecyl alcohol ($C_{17}$), stearyl alcohol ($C_{18}$), nonadecyl alcohol ($C_{19}$), eicosyl alcohol ($C_{20}$), etc. Exemplary polyhydric alcohols include glycerin, sorbitol, ethylene glycol, diethylene glycol, triethylene glycol, polyethylene glycol, propylene glycol, dipropylene glycol, tripropylene glycol, polypropylene glycol, trimethylolpropane, pentaerythritol, 1,3-butanediol, etc. In the case of esters of monovalent fatty acids and polyhydric alcohols, y out of x hydroxyl groups in x-hydric alcohols (y is an integer of at least one but not more than x) may form an ester bond while (x-y) hydroxyl groups remain intact.

Specific examples include stearyl undecylate, stearyl laurate, stearyl tridecylate, stearyl myristate, stearyl palmitate, butyl stearate, lauryl stearate, butyl arachidate, butyl behenate, butyl oleate, pentaerythritol tetrastearate, ethylene glycol monostearate, poly(ethylene glycol dilaurate), poly(ethylene glycol monooleate), poly(ethylene glycol dioleate), butyl ricinoleate, glycerin monocaprylate, glycerin monocaprate, glycerin monolaurate, glycerin monomyristate, glycerin monopalmitate, glycerin monostearate, glycerin monooleate, glycerin monoerucate, glycerin monolinolate, glycerin trilaurate, glycerin trimyristate, glycerin tripalmitate, glycerin tristearate, glycerin trioleate, etc.

Preferred fatty acid ester compounds are stearyl laurate, stearyl myristate, stearyl palmitate, butyl stearate, pentaerythritol tetrastearate, ethylene glycol monostearate, poly (ethylene glycol dilaurate), poly(ethylene glycol monooleate), glycerin monopalmitate, and glycerin monostearate; more preferred are stearyl laurate, stearyl myristate, stearyl palmitate, ethylene glycol monostearate, poly(ethylene glycol dilaurate), poly(ethylene glycol monooleate), and glycerin monostearate; even more preferred are stearyl myristate, stearyl palmitate, ethylene glycol monostearate, and glycerin monostearate; particularly preferred is glycerin monostearate.

The fatty acid metal salt compounds include salts of the above-listed fatty acids and the following metals. Exemplary metals include lithium, magnesium, calcium, strontium, barium, zinc, cadmium, aluminum, tin, and lead; preferred are calcium and zinc; particularly preferred is calcium. Specific examples of the fatty acid metal salt compounds include lithium stearate, magnesium stearate, calcium stearate, calcium laurate, calcium ricinoleate, strontium stearate, barium stearate, barium laurate, barium ricinoleate, cadmium stearate, cadmium laurate, cadmium ricinoleate, cadmium naphthenate, cadmium 2-ethylhexoate, zinc stearate, zinc laurate, zinc ricinoleate, zinc 2-ethyhexoate, lead stearate, lead naphthenate, etc.; preferred are magnesium stearate, calcium stearate and zinc stearate; more preferred are calcium stearate and zinc stearate; particularly preferred is calcium stearate.

Exemplary fatty acid amide compounds include compounds represented by $RCONH_2$, methylenebisamide compounds represented by $RCONH-CH_2-NHCOR$, and ethylenebisamide compounds represented by $RCONH-CH_2CH_2-NHCOR$; these are amide compounds obtained from carboxylic acid compounds represented by $RCOOH$ and from ammonia, methylenediamine and ethylenediamine, respectively. Exemplary carboxylic acid compounds represented by $RCOOH$ include the above-listed fatty acids. The fatty acid amide compounds may specifically be exemplified by palmitylamide, stearylamide, oleylamide, methylenebisstearoamide, ethylenebisstearoamide, etc.; preferred are palmitylamide and stearylamide, with stearylamide being further preferred.

The aliphatic alcohols include monohydric alcohols and polyhydric alcohols. Monohydric alcohols include $C_8$-$C_{32}$ linear monohydric alcohols and specific examples include octyl alcohol ($C_8$), nonyl alcohol ($C_9$), decyl alcohol ($C_{10}$), undecyl alcohol ($C_{11}$), lauryl alcohol ($C_{12}$), tridecyl alcohol ($C_{13}$), myristyl alcohol ($C_{14}$), pentadecyl alcohol ($C_{15}$), cetyl alcohol ($C_{16}$), heptadecyl alcohol ($C_{17}$), stearyl alcohol ($C_{18}$), nonadecyl alcohol ($C_{19}$), eicosyl alcohol ($C_{20}$), ceryl alcohol ($C_{26}$), melissyl alcohol ($C_{30}$), etc.; exemplary polyhydric alcohols include glycerin, sorbitol, ethylene glycol, diethylene glycol, triethylene glycol, polyethylene glycol, propylene glycol, dipropylene glycol, tripropylene glycol, polypropylene glycol, trimethylolpropane, pentaerythritol, 1,3-butanediol, etc. Preferred examples are $C_8$-$C_{20}$ linear monohydric alcohols, glycerin, ethylene glycol, diethylene glycol, and polyethylene glycol; more preferred examples are nonyl alcohol, lauryl alcohol, myristyl alcohol, cetyl alcohol, stearyl alcohol, glycerin, ethylene glycol, diethylene glycol, and polyethylene glycol; even more preferred examples are cetyl alcohol and stearyl alcohol, with stearyl alcohol being particularly preferred.

Preferred among the aliphatic compounds listed above are: $C_{11}$-$C_{22}$ linear saturated fatty acids, naphthenic acid, oleic acid, erucic acid, sorbic acid, linoleic acid, linolenic acid and ricinolic acid (as fatty acid compounds); stearyl laurate, stearyl myristate, stearyl palmitate, butyl stearate, pentaerythritol tetrastearate, ethylene glycol monostearate, poly (ethylene glycol dilaurate), poly(ethylene glycol monooleate), glycerin monopalmitate and glycerin monostearate (as fatty acid ester compounds); magnesium stearate, calcium stearate and zinc stearate (as fatty acid metal salt compounds); palmitylamide and stearylamide (as fatty acid amide compounds); and $C_8$-$C_{20}$ linear monohydric alcohols, glycerin, ethylene glycol, diethylene glycol and polyethylene glycol (as aliphatic alcohols).

More preferred examples are: undecylic acid ($C_{11}$), lauric acid ($C_{12}$), tridecylic acid ($C_{13}$), myristic acid ($C_{14}$), palmitic acid ($C_{16}$), stearic acid ($C_{18}$), behenic acid ($C_{22}$), oleic acid, erucic acid and sorbic acid (as fatty acid compounds); stearyl laurate, stearyl myristate, stearyl palmitate, ethylene glycol monostearate, poly(ethylene glycol dilaurate), poly(ethylene glycol monooleate) and glycerin monostearate (as fatty acid ester compounds); magnesium stearate, calcium stearate and zinc stearate (as fatty acid metal salt compounds); palmitylamide and stearylamide (as fatty acid amide compounds); and nonyl alcohol, lauryl alcohol, myristyl alcohol, cetyl alcohol, stearyl alcohol, glycerin, ethylene glycol, diethylene glycol and polyethylene glycol (as aliphatic alcohols). Even more preferred are: myristic acid ($C_{14}$), palmitic acid ($C_{16}$), stearic acid ($C_{18}$) and behenic acid ($C_{22}$) (as fatty acid compounds); stearyl myristate, stearyl palmitate, ethylene glycol monostearate and glycerin monostearate (as fatty acid ester compounds); calcium stearate and zinc stearate (as fatty acid metal salt compounds); stearylamide (as fatty acid amide compound); and cetyl alcohol and stearyl alcohol (as aliphatic alcohols); particularly preferred are stearic acid (fatty acid compound), glycerin monostearate (fatty acid ester compound), and calcium stearate (fatty acid metal salt compound). The aliphatic compounds to be contained in the resin composition of the present invention may be used either singly or in combination of two or more kinds.

In the optical unit of the present invention, the low Abbe number lens material may contain a pentavalent organophosphorus compound in addition to the polycarbonate copolymer (A).

The addition of a pentavalent organophosphorus compound contributes to trapping and immobilizing trace amounts of metals present in the low Abbe number lens material, thereby suppressing any adverse effects, such as coloring, of the metals.

Here, a pentavalent organophosphorus compound is preferably contained in an amount of 0.00005-0.5 parts by mass, more preferably 0.0001-0.1 part by mass, even more preferably 0.001-0.08 parts by mass, for 100 parts by mass of the polycarbonate copolymer (A).

The pentavalent orgaphosphorus compound to be contained in the low Abbe number lens material encompasses phosphoric esters, acidic phosphoric esters and other phosphorus compounds; they may be either aromatic or aliphatic; if they are aliphatic, the aliphatic chain may be linear, branched or cyclic. The phosphorus compounds may be substituted by a halogen atom, a carboxyl group, an alkylcarbonyl group, an alkoxycarbonyl group, an alkoxy group, etc. Among these substituents, two or more identical or different substituents may be contained in the molecule.

Specific examples of phosphoric esters include trimethyl phosphate, triethyl phosphate, tripropyl phosphate, tributyl phosphate, trioctyl phosphate, triphenyl phosphate, tritolyl phosphate, tris(t-butylphenyl)phosphate, triallyl phosphate, diphenyltolyl phosphate, tris(butoxyethyl)phosphate, tris(2-chloroethyl)phosphate, tris(2-chloromethyletyl)phosphate, tris(1,3-dichloro-2-propyl)phosphate, and tris(2,3-dibromopropyl)phosphate.

Specific examples of acidic phosphoric ester compounds include dibutyl phosphate, di(2-ethylhexyl)phosphate, diphenyl phosphate, dibenzyl phosphate, ethyl acid phosphate, butyl acid phosphate, butyl pyrophosphate, 2-ethylhexyl acid phosphate, oleyl acid phosphate, tetracosyl acid phosphate, ethylene glycol acid phosphate, and butoxyethyl acid phosphate. Examples of other phosphorus compounds include ethyldiethyl phosphonoacetate.

The pentavalent organophosphorus compound to be contained in the low Abbe number lens material is preferably a phosphoric ester compound that does not contain an acidic functional group; more preferred examples are trimethyl phosphate, triethyl phosphate, tripropyl phosphate, tributyl phosphate, trioctyl phosphate, triphenyl phosphate, tritolyl phosphate, tris(t-butylphenyhl) phosphate, triallyl phosphate, diphenyltolyl phosphate, and ethyldiethyl phosphonoacetate; even more preferred examples are trimethyl phosphate, triethyl phosphate, triphenyl phosphate, tritolyl phosphate, tris(t-butylphenyhl) phosphate, diphenyltolyl phosphate, and ethyldiethyl phosphonoacetate; particularly preferred are trimethyl phosphate and ethyldiethyl phosphonoacetate.

In the optical unit of the present invention, another mode of the low Abbe number lens material comprises a polycarbonate copolymer (B) having structural units represented by the following general formulas (2) and (3):

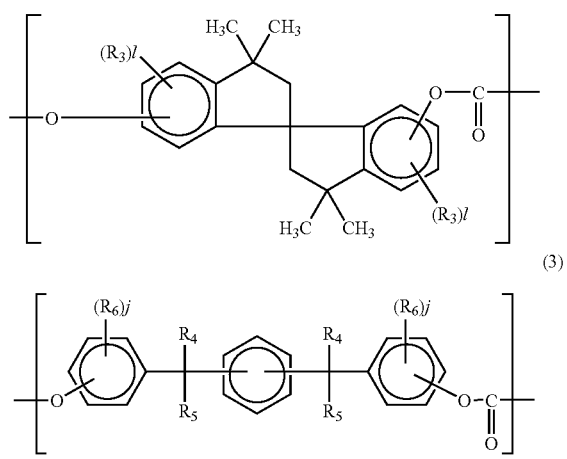

where $R_3$'s are each independently an alkyl group, an alkoxy group, a nitro group or a halogen atom; $R_4$ and $R_5$ are each independently a hydrogen atom or an alkyl group; $R_6$'s are each independently an alkyl group, an alkoxy group or a halogen atom; l's are each independently an integer of 0-3; and j's are each independently an integer of 0-2.

Here, the structural unit represented by the general formula (2) has the same definition as given to the polycarbonate copolymer (A).

In the structural unit represented by the general formula (3), $R_4$ and $R_5$ are each independently a hydrogen atom or an alkyl group. Specific examples of $R_4$ and $R_5$ may include a hydrogen atom, a methyl group, an ethyl group, an n-propyl group, an isopropyl group, an n-butyl group, an isobutyl group, a sec-butyl group, a tert-butyl group, an n-pentyl group, an n-hexyl group, a 2-ethylhexyl group, an n-octyl group, an n-decyl group, an n-dodecyl group, an n-tetradecyl group, an n-octadecyl group, a cyclopentyl group, a cyclohexyl group, a 4-tert-butylcyclohexyl group, a trifluoromethyl group, etc.

The substituents $R_4$ and $R_5$ are preferably a hydrogen atom or a linear, branched or cyclic alkyl group having 1-10 carbon atoms, more preferably a hydrogen atom or a linear alkyl group having 1-4 carbon atoms, with a methyl group being particularly preferred as the substituents $R_4$ and $R_5$.

$R_6$'s are each independently an alkyl group, an alkoxy group or a halogen atom, preferably an optionally substituted linear, branched or cyclic alkyl group, an optionally substituted linear, branched or cyclic alkoxy group, or a halogen atom, more preferably an optionally substituted linear, branched or cyclic alkyl group having 1-20 carbon atoms, an optionally substituted linear, branched or cyclic alkoxy group having 1-20 carbon atoms, or a halogen atom. The substituent on the alkyl or alkoxy group as $R_6$ may be exemplified by an alkoxy group, an alkoxyalkoxy group, a cycloalkyl group, a cycloalkyl group containing a hetero atom, a cycloalkoxy group, a cycloalkoxy group containing a hetero atom, an aryloxy group, an aryloxyalkoxy group, a halogen atom, etc.

Specific examples of the substituent $R_6$ include a methyl group, an ethyl group, an n-propyl group, an isopropyl group, an n-butyl group, an isobutyl group, a sec-butyl group, a tert-butyl group, an n-pentyl group, an n-hexyl group, a 2-ethylhexyl group, an n-octyl group, an n-decyl group, an n-dodecyl group, an n-tetradecyl group, an n-octadecyl group, a cyclopentyl group, a cyclohexyl group, a 4-tert-butylcyclohexyl group, a cycloheptyl group, a cyclooctyl group, a cyclohexylmethyl group, a cyclohexylethyl group, a tetrahydrofurfuryl group, a 2-methoxyethyl group, a 2-ethoxyethyl group, a 2-n-butoxyethyl group, a 3-methoxypropyl group, a 3-ethoxypropyl group, a 3-n-propoxypropyl group, a 3-n-butoxypropyl group, a 3-n-hexyloxypropyl group, a 2-methoxyethoxyethyl group, a 2-ethoxyethoxyethyl group, a 2-phenoxymethyl group, a 2-phenoxyethoxyethyl group, a trifluoromethyl group, a chloromethyl group, a 2-chloroethyl group, a 3-chloropropyl group, a 2,2,2-trichloroethyl group, a methoxy group, an ethoxy group, an n-propoxy group, an isopropoxy group, an n-butoxy group, an isobutoxy group, a sec-butoxy group, an n-pentyloxy group, an n-hexyloxy group, a 2-ethylhexyloxyl group, an n-octyloxy group, an n-decyloxy group, an n-dodecyloxy group, an n-tetradecyloxy group, an n-octadecyloxy group, a cyclopentyloxy group, a cyclohexyloxy group, a 4-tert-butylcyclohexyloxy group, a cycloheptyloxy group, a cyclooctyloxy group, a cyclohexylmethoxy group, a cyclohexylethoxy group, a 2-methoxyethyl group, a 2-ethoxyethoxy group, a 2-n-butoxyethoxy group, a 3-methoxypropoxy group, a 3-ethoxypropoxy group, a 3-n-propoxypropoxy group, a 3-n-butoxypropoxy group, a 3-n-hexyloxypropoxy group, a 2-methoxyethoxyethoxy group, a 2-phenoxymethoxy group, a 2-phenoxyethoxyethoxy group, a chloromethoxy group, a 2-chloroethoxy group, a 3-chloropropoxy group, a 2,2,2-trichloroethoxy group, a fluorine atom, a chlorine atom, a bromine atom, an iodine atom, etc.

The substituent $R_6$ is preferably an unsubstituted linear or branched alkyl group having 1-10 carbon atoms, an unsubstituted linear or branched alkoxy group having 1-10 carbon atoms, or a fluorine atom or a chlorine atom, more preferably a methyl group, an ethyl group, an n-propyl group, an isopropyl group, an n-butyl group, an isobutyl group, a tert-butyl group, a methoxy group, an ethoxy group, an n-propoxy group, an isopropoxy group, an n-but oxy group, a n isobutoxy group, a tert-butoxy group, a fluorine atom or a chlorine atom. A methyl group and a fluorine atom are particularly preferred as the substituent $R_6$. In the structural unit represented by the general formula (3), j's are each independently an integer of 0-2, preferably 0 or 1. The integer zero is particularly preferred as j. Among the repeating structural units represented by the general formula (3), the one represented by the following formula (3A) is particularly preferred.

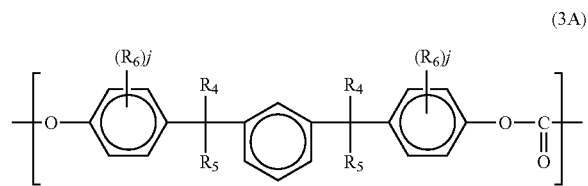

(3A)

where $R_4$, $R_5$, $R_6$ and j have the same meanings as defined above.

The polycarbonate copolymer (B) of the present invention can be obtained by reacting a carbonate precursor with a dihydroxy compound represented by the following general formula (2a) and a dihydroxy compound represented by the following general formula (3a) so that they are copolymerized.

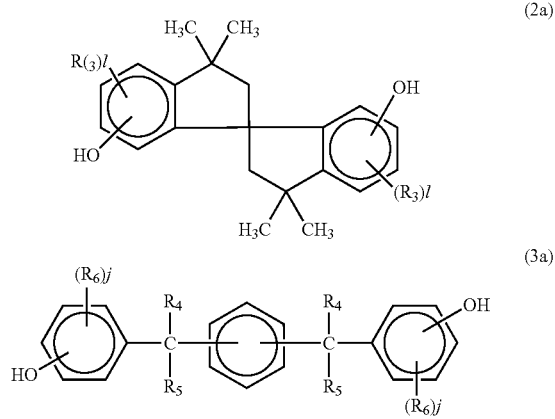

(2a)

(3a)

where $R_3$, $R_4$, $R_5$, $R_6$, l and j have the same meanings as defined above.

The dihydroxy compound represented by the general formula (2a) has the same definition as given to the polycarbonate copolymer (A)

The dihydroxy compound represented by the general formula (3a) which is the other main starting material for the polycarbonate copolymer (B) may be exemplified by the following compounds, which are by no means intended to limit the present invention.

α,α'-bis (4-hydroxyphenyl)-1, 3-diisopropylbenzene, α,α'-bis(4-hydroxy-2-methylphenyl) -1,3-diisopropylbenzene, α,α'-bis(4-hydroxy-2-ethylphenyl)-1,3-diisopropylbenzene, α,α'-bis(4-hydroxy-2-n-propylphenyl)-1,3-diisopropylbenzene, α,α'-bis(4-hydroxy-2-isopropylphenyl)-1,3-diisopropylbenzene, α,α'-bis(4-hydroxy-2-n-butylphenyl)-1,3-diisopropylbenzene, α,α'-bis(4-hydroxy-2-isobutylphenyl)-1,3-diisopropylbenzene, α,α'-bis(4-hydroxy-2-tert-butylphenyl)-1,3-diisopropylbenzene, α,α'-bis(4-hydroxy-2-n-pentylphenyl)-1,3-diisopropylbenzene, α,α'-bis(4-hydroxy-2-isopentylphenyl)-1,3-diisopropylbenzene, α,α'-bis(4-hydroxy-2-n-hexylphenyl)-1,3-diisopropylbenzene, α,α'-bis(4-hydroxy-2-n-octylphenyl)-1,3-diisopropylbenzene, α,α'-1-bis(4-hydroxy-2-methoxyphenyl)-1,3-diisopropylbenzene, α,α'-bis(4-hydroxy-2-ethoxyphenyl)-1,3-diisopropylbenzene, α,α'-bis(4-hydroxy-2-n-propoxyphenyl)-1,3-diisopropylbenzene, α,α -bis(4-hydroxy-2-isopropoxyphenyl)-1,3-diisopropylbenzene, α,α'-bis(4-hydroxy-2-n-butoxyphenyl)-1,3-diisopropylbenzene, α,α'-bis(4-hydroxy-3-nitrophenyl)-1,3-diisopropylbenzene, α,α'-bis(4-hydroxy-3-fluorophenyl)-1,3-diisopropylbenzene, α,α'-bis(4-hydroxy-3-bromophenyl)-1,3-diisopropylbenzene, α,α'-bis(4-hydroxy-3-chlorophenyl)-1, 3-diisopropylbenzene, α,α'-bis(4-hydroxy-3-iodophenyl)-1, 3-diisopropylbenzene, α,α'-bis(4-hydroxy-3-chloro-2-methylphenyl)-1,3-diisopropylbenzene, α,α'-bis(4-hydroxyphenyl)-1,4-diisopropylbenzene, α,α'-bis(4-hydroxy-2-methylphenyl)-1,4-diisopropylbenzene, α,α'-bis (4-hydroxy-2-methoxyphenyl)-1,4-diisopropylbenzene, α,α'-bis(4-hydroxy-2-ethoxyphenyl)-1,4-diisopropylbenzene, α,α'-bis(4-hydroxy-3-nitrophenyl)-1,4-diisopropylbenzene, α,α'-bis(4-hydroxy-3-fluorophenyl)-1,4-diisopropylbenzene, α,α'-bis(4-hydroxy-3-chlorophenyl)-1,4-diisopropylbenzene, and α,α'-bis(4-hydroxyphenyl)-1,3-diethylbenzene.

The dihydroxy compound represented by the general formula (3a) may advantageously be produced by known methods such as those described in JP 8-13770A, for example, the method of reacting compounds such as α,α'-dihydroxydiisopropylbenzenes or diisopropenylbenzenes with phenols in the presence of an acid catalyst such as an ion exchange resin.

The polycarbonate copolymer (B) can be produced by known production methods, specifically by the same methods as described above for the polycarbonate copolymer (A).

The polycarbonate copolymer (B) is not limited in any particular way as long as it is a polycarbonate copolymer containing the structural unit represented by the above general formula (2) and the structural unit represented by the general formula (3). Therefore, it may be either a random copolymer or an alternating copolymer or a block copolymer.

The polycarbonate copolymer (B) may contain plural structural units being different from each other as the structural unit represented by the general formula (2). The polycarbonate copolymer (B) may contain plural structural units being different from each other as the structural unit represented by the general formula (3).

Considering the balance which the polycarbonate copolymer (B) desirably presents between physical properties including heat resistance and mechanical properties, the proportion of the structural units of the general formulas (2) and (3) that is occupied by the structural unit of the general formula (2) is preferably 5-90 mol %, more preferably 10-80 mol %, and even more preferably 20-70 mol %.

The polycarbonate copolymer (B) may contain structural units other than those represented by the general formulas (2) and (3). If it contains other structural units, the proportion of the total structural units that is occupied by those represented by the general formulas (2) and (3) is not limited to any particular value as long as it is within the range that is not detrimental to the desired effects of the present invention; usually, it is at least 50 mol %, preferably at least 70 mol %, and more preferably at least 90 mol %. In order to maximize the desired effects of the present invention, it is particularly preferred that the polycarbonate copolymer (B) is solely composed of the structural units represented by the general formulas (2) and (3).

The other structural units the polycarbonate copolymer (B) may contain in addition to the structural units represented by the general formulas (2) and (3) can be selected from the wide range of compounds that have been given as examples of the other structural units that may be contained in the polycarbonate copolymer (A).

In the polycarbonate copolymer (B), the terminal groups may be reactive ones such as a hydroxyl group, a haloformate group, a carbonic ester group, etc.; alternatively, they may be inert terminal groups capped with a molecular weight regulator as in the case of the polycarbonate copolymer (A). The amount of the terminal groups within the polycarbonate copolymer (B) is not limited to any particular value but it is typically between 0.001 and 10 mol %, preferably between 0.01 and 5 mol %, more preferably between 0.1 and 3 mol %, based on the total number of moles of the structural units.

As described above for the polycarbonate copolymer (A), in the optical unit of the present invention, the intrinsic viscosity of the low Abbe number lens material is preferably between 0.25 and 0.50, more preferably between 0.25 and 0.35. Therefore, the polycarbonate copolymer (B) preferably has an intrinsic viscosity within the stated ranges.

To this end, the polycarbonate copolymer (B) has a mass average molecular weight between 5,000 and 200,000, preferably between 10,000 and 150,000, more preferably between 15,000 and 120,000, as calculated for the standard polystyrene by GPC (gel permeation chromatography). The polydispersity index, expressed as the ratio between mass average molecular weight and number average molecular weight, of the polycarbonate copolymer (B) is not limited to any particular value but is preferably between 1.5 and 20.0, more preferably between 2.0 and 15.0, and even more preferably between 2.0 and 10.0.

In order to obtain the polycarbonate copolymer (B) whose mass average molecular weight and polydispersity index are within the stated ranges, the making of the polycarbonate copolymer (B) in accordance with the methods described above is preferably done by performing polymerization in the presence of a molecular weight regulator for the specific purpose of regulating the molecular weight. As a molecular weight regulator, it can be selected from the wide range of the molecular weight regulator that have been given as examples of the molecular weight regulator for the polycarbonate copolymer (A). Among the molecular weight regulators, phenol and p-tert-butylphenol are preferred.

In order to obtain the polycarbonate copolymer (B) having an intrinsic viscosity within the stated ranges, the molecular weight regulator is added in an amount between 0.001 and 10 mol % in terms of molar ratio to the diol component. If phenol is used as the molecular weight regulator, it is preferably added in an amount between 0.01 and 5 mol % in terms of molar ratio to the diol component. If p-tert-butylphenol is used as the molecular weight regulator, it is preferably added in an amount between 0.01 and 10 mol % in terms of molar ratio to the diol component.

Again in the case where it contains the polycarbonate copolymer (B), the low Abbe number lens material may, in addition to the polycarbonate copolymer (B), further contain either one of an epoxy compound, a phosphite compound, an aliphatic compound and a pentavalent organophosphorus compound. Note that an epoxy compound and a phosphite compound may be contained at the same time.

Specific examples of the epoxy compound, phosphite compound, aliphatic compound and pentavalent organophosphorus compound are the same as those given in connection with the polycarbonate copolymer (A).

When the low Abbe number lens material contains an epoxy compound, it may preferably be contained in an amount of 0.0005-5 parts by mass for 100 parts by mass of the polycarbonate copolymer (B). More preferably, it may be contained in an amount of 0.001-3 parts by mass for 100 parts by mass of the polycarbonate copolymer (B), with 0.01-2 parts by mass being even more preferred. When the low Abbe number lens material contains a phosphite compound, it may preferably be contained in an amount of 0.0005-5 parts by mass, more preferably 0.001-3 parts by mass, and even more preferably 0.01-2 parts by mass, for 100 parts by mass of the polycarbonate copolymer (B). When the low Abbe number lens material contains an aliphatic compound, it may preferably be contained in an amount of 0.0005-5 parts by mass, more preferably 0.001-3 parts by mass, and even more preferably 0.01-2 parts by mass, for 100 parts by mass of the polycarbonate copolymer (B). When the low Abbe number lens material contains a pentavalent organophosphorus compound, it may preferably be contained in an amount of 0.00005-0.5 parts by mass, more preferably 0.0001-0.1 part by mass, and even more preferably 0.001-0.08 parts by mass, for 100 parts by mass of the polycarbonate copolymer (B).

In the optical unit of the present invention, yet another mode of the low Abbe number lens material comprises a polycarbonate copolymer (C) that has structural units represented by the following general formulas (4), (5) and (6) and wherein the structural unit of the general formula (4) assumes 5-50 moles in all structural units:

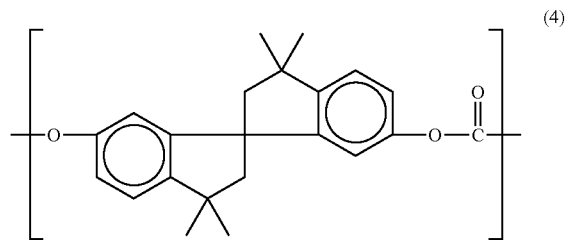

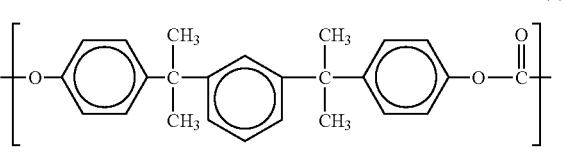

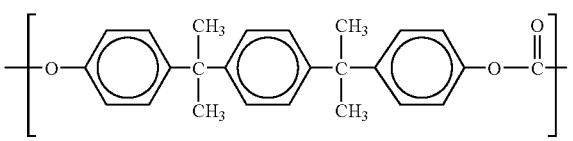

The above-mentioned polycarbonate copolymer (C) is obtained by reacting a carbonic ester forming compound with the following three compounds: 6,6'-dihydroxy-3,3,3',3'-tetramethyl-1,1'-spirobiindan from which the structural unit represented by the above general formula (4) is derived; 4,4'-[1,3-phenylenebis(1-methylethylidene)]bisphenol from which the structural unit represented by the above general formula (5) is derived; and 4,4'-[1,4-phenylenebis(l-methylethylidene)]bisphenol from which the structural unit represented by the above general formula (6) is derived.

Carbonic ester forming compounds may, for example, include phosgene and bisaryl carbonates such as diphenyl carbonate, di-p-tolyl carbonate, phenyl-p-tolyl carbonate, di-p-chlorophenyl carbonate, and dinaphthyl carbonate. These compounds can be used in combination of two or more kinds.

The above-mentioned polycarbonate copolymer (C) can be synthesized from the above-mentioned starting materials using known methods that are employed to produce polycarbonates from bisphenol A, such as, for example, direct reaction between bisphenols and phosgene (the phosgene process), or transesterification between bisphenols and bisaryl carbonates (the transesterification process).

In the former method (phosgene process), 6,6'-dihydroxy-3,3,3',3'-tetramethyl-1,1'-spirobiindan from which the structural unit represented by the above general formula (4) is derived, 4,4'-[1,3-phenylenebis(1-methylethylidene)]bisphenol from which the structural unit represented by the above general formula (5) is derived, and 4,4'-[1,4-phenylenebis(1-methylethylidene)]bisphenol from which the structural unit represented by the above general formula (6) is derived are reacted with phosgene, typically in the presence of an acid binder and a solvent. Exemplary acid binders that can be used are pyridine and alkali metal hydroxides such as sodium hydroxide and potassium hydroxide. Exemplary solvents that can be used are methylene chloride, chloroform, chlorobenzene, and xylene. For accelerated polycondensation reaction, tertiary amine catalysts such as triethylamine, or catalysts such as quaternary ammonium salts are used. For regulating molecular weight, compounds having a monofunctional group, such as phenol, p-t-butylophenol, p-cumylphenol and long-chain alkylphenols are added as molecular weight regulators. If desired, antioxidants such as sodium sulfite and hydrosulfite, or branching agents such as phloroglucine, isatin bisphenol, 1,1,1-tris(4-hydroxyphenyl)ethane and α,α',α"-tris(4-hydroxy(phenyl)-1,3,5-triisopropylbenzene may also be added in small amounts. The suitable reaction temperature is typically in the range between 0 and 150° C., preferably between 5 and 40° C. The reaction time, which depends on the reaction temperature, is typically between 0.5 minutes and 10 hours, preferably between 1 minute and 2 hours. During the reaction, the pH of the reaction system is preferably held at 10 and above.

In the latter method (transesterification process), 6,6'-dihydroxy-3,3,3',3'-tetramethyl-1,1'-spirobiindan from which the structural unit represented by the above general formula (4) is derived, 4,4'-[1,3-phenylenebis(1-methylethylidene)]bisphenol from which the structural unit represented by the above general formula (5) is derived, and 4,4'-[1,4-phenylenebis(1-methylethylidene)]bisphenol from which the structural unit represented by the above general formula (6) is derived are mixed with a bisaryl carbonate to effect reaction under vacuum at elevated temperature. In this case, compounds having a monofunctional group, such as p-t-butylophenol, p-cumylphenol and long-chain alkylphenols may be added as molecular weight regulators. Reaction is typically performed at a temperature in the range between 150 and 350° C., preferably between 200 and 300° C. The degree of vacuum is preferably adjusted to a final value of 1 mmHg or less so that bisphenols that originate from the bisaryl carbonate as the result of transesterification are distilled off from the reaction system. The reaction time, which depends on the reaction temperature and the degree of vacuum, is typically between about 1 and 6 hours. The reaction is preferably performed in an inert gas atmosphere such as nitrogen or argon. If desired, the reaction may be performed in the presence of an added antioxidant or branching agent.

When the reactivities of the compound from which the structural unit represented by the above general formula (4) is derived, the compound from which the structural unit represented by the above general formula (5) is derived, and the compound from which the structural unit represented by the above general formula (6) is derived are considered, the phosgene process is preferred to the transesterification process.

If the phosgene process is adopted in the present invention, a small amount of quaternary ammonium salt is preferably added after phosgene blowing ends in order to ensure an efficient progress of reaction. The quaternary ammonium salt may specifically be exemplified by tetramethylammonium chloride, trimethylbenzylammonium chloride, triethylbenzylammonium chloride, tetraethylammonium bromide, tetra-n-butylammonium iodide, etc. Among these, trimethylbenzylammonium chloride and triethylbenzylammonium chloride are preferred. The quaternary ammonium salt in general is preferably used in an amount of 0.0005-5 mol % with respect to all bisphenols used. Three to ten minutes after the addition of the quaternary ammonium salt, a tertiary amine such as triethylamine and a molecular weight regulator are preferably added to effect polymerization. The amount of the tertiary amine to be added is 0.01-1.0 mol % with respect to all the bisphenols. The amount of the molecular weight regulator to be added will be described later.

Considering moldability, heat resistance and low birefringence, the amount in which 6,6'-dihydroxy-3,3,3',3'-tetramethyl-1,1'-spirobiindan is used in the polycarbonate copolymer (C) is preferably between 10 and 90 mol % in all structural units with respect to the sum of 6,6'-dihydroxy-3,3,3',3'-tetramethyl-1,1'-spirobiindan and 4,4'-[1,3-phenylene(l-methylethylidene)]bisphenol. If the use of 6,6'-dihydroxy-3,3,3',3'-tetramethyl-1,1'-spirobiindan is less than 10 mol %, the lens fabricated using the polycarbonate copolymer (C) cannot exhibit the desired low birefringence. If, on the other hand, the use of 6,6'-dihydroxy-3,3,3',3'-tetramethyl-1,1'-spirobiindan exceeds 90 mol %, the melting temperature of the polycarbonate copolymer (C) increases to render injection molding difficult. In addition, the temperature increases during injection molding, yielding a shaped part with insufficient strength.

As described above for the polycarbonate copolymer (A), in the optical unit of the present invention, the intrinsic viscosity of the low Abbe number lens material is preferably between 0.25 and 0.50, more preferably between 0.25 and 0.35. Therefore, the polycarbonate copolymer (C) preferably has an intrinsic viscosity within the stated ranges.

In either case the phosgene process is employed or the transesterification process is employed, those process are described above, the intrinsic viscosity of the polycarbonate copolymer (C) can be controlled by the addition of a molecular weight regulator in a desired amount. As a molecular weight regulator, it can be selected from the wide range of the molecular weight regulator that have been given as examples of the molecular weight regulator for the polycarbonate copolymer (A). Among the molecular weight regulators, phenol and p-tert-butylphenol are preferred.

In order to obtain the polycarbonate copolymer (C) having an intrinsic viscosity within the stated ranges, the molecular weight regulator is added in an amount between 0.01 and 10 mol % in terms of molar ratio to the diol component. Preferably, the molecular weight regulator is added in an amount between 0.1 and 8 mol % in terms of molar ratio to the diol component.

From the viewpoints of moldability, heat resistance and low birefringence that are required of the lenses in optical units for high-resolution applications, the structural unit represented by the above general formula (4) assumes 5-50 mol % in all the structural units of the polycarbonate copolymer (C). If the structural unit represented by the general formula (4) is less than 5 mol %, the copolymer is not very effective in improving birefringence; if the structural unit (4) exceeds 50 mol %, the glass transition temperature elevates to narrow the range of molding conditions and not only molding problems but also increased birefringence due to molecular alignment are prone to occur.

In addition, considering lens moldability, the structural unit represented by the above general formula (5) preferably assumes 20-80 mol % in all structural units of the polycarbonate copolymer (C). If the structural unit represented by the general formula (5) is less than 20 mol %, moldability decreases; if it exceeds 80 mol %, the flowability becomes so great as to increase the chance of sticking and other molding problems.

In the optical unit of the present invention, still another mode of the low Abbe number lens material comprises a polycarbonate copolymer (D) that has structural units represented by the following general formulas (4), (5) and (7) and wherein the structural unit of the general formula (4) assumes 5-50 moles in all structural units:

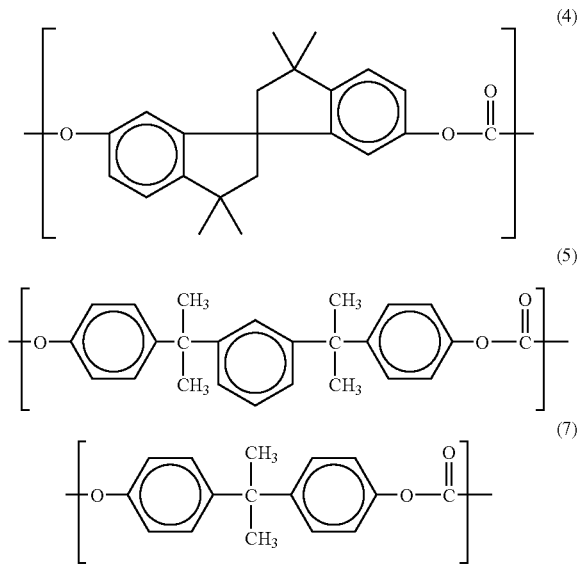

The above-mentioned polycarbonate copolymer (D) is obtained by reacting a carbonic ester forming compound with the following three compounds: 6,6'-dihydroxy-3,3,3',3'-tetramethyl-1,1'-spirobiindan from which the structural unit represented by the above general formula (4) is derived; 4,4'-[1,3-phenylenebis(1-methylethylidene)]bisphenol from which the structural unit represented by the above general formula (5) is derived; and 2,2'-(4-hydroxyphenyl)propane from which the structural unit represented by the above general formula (7) is derived. Hence, the procedure of making the above-described polycarbonate copolymer (C) may be followed except that 2,2'-(4-hydroxyphenyl)propane is used instead of 4,4'-[1,4-phenylenebis(1-methylethylidene)]bisphenol.

As described above for the polycarbonate copolymer (A), in the optical unit of the present invention, the intrinsic viscosity of the low Abbe number lens material is preferably between 0.25 and 0.50, more preferably between 0.25 and 0.35. Therefore, the polycarbonate copolymer (D) preferably has an intrinsic viscosity within the stated ranges.

In either case the phosgene process is employed or the transesterification process is employed, those process are described above, the intrinsic viscosity of the polycarbonate copolymer (D) can be controlled by the addition of a molecular weight regulator in a desired amount. As a molecular weight regulator, it can be selected from the wide range of the molecular weight regulator that have been given as examples of the molecular weight regulator for the polycarbonate copolymer (A). Among the molecular weight regulators, phenol and p-tert-butylphenol are preferred.

In order to obtain the polycarbonate copolymer (D) having an intrinsic viscosity within the stated ranges, the molecular weight regulator is added in an amount between 0.01 and 10 mol % in terms of molar ratio to the diol component. Preferably, the molecular weight regulator is added in an amount between 0.1 and 8 mol % in terms of molar ratio to the diol component.

In the optical unit of the present invention, yet another mode of the low Abbe number lens material comprises a polycarbonate copolymer (E) that is obtained by reacting a carbonic ester forming compound with 6,6'-dihydroxy-3,3,3', 3'-tetramethyl-1,1'-spirobiindan, 4,4'-[1,3-phenylenebis(1-methylethylidene)]bisphenol, and a compound having a trifunctional or higher phenolic hydroxyl group.

The carbonic acid ester forming compound can be chosen from the wide range of compounds described above in connection with the polycarbonate copolymer (C). To make the polycarbonate copolymer (E), the methods described above in connection with the polycarbonate copolymer (C), namely, the phosgene process, the transesterification process, etc., may be employed. The procedure of polycarbonate copolymer production by the phosgene process or the transesterification process is the same as described for the polycarbonate copolymer (C) except that the compound having a trifunctional or higher phenolic hydroxyl group is used in addition to 6,6'-dihydroxy-3,3,3',3'-tetramethyl-1,1'-spirobiindan and 4,4'-[1,3-phenylenebis(1-methylethylidene)]bisphenol.

The compound having a trifunctional or higher phenolic hydroxyl group which acts as a branching agent may be exemplified by phloroglucine, 2,4,4'-trihydroxybenzophenone, 2,4,4'-trihydroxydiphenyl ether, 2,2-bis(2,4-dihydroxyphenyl)propane, 2,2',4,4'-tetrahydroxydiphenylmethane, 2,4,4'-trihydroxydiphenylmethane, 2,4,6-tris(4-hydroxyphenyl)-2,6-dimethyl-heptene, 2,4,6-tris(4-hydroxyphenyl)-4,6-dimethyl-heptane, 2,6-bis(2-hydroxy-5-methylbenzyl)-4-methylphenol, 2,6-bis(2-hydroxy-5-isopropylbenzyl)-4-isopropylphenol, tetraquis(4-hydroxyphenyl)methane, α,α', α''-tris(4-hydroxyphenyl)-1,3,5-triisopropylbenzene, 4,4'-[1-[4-[1-(4-hydroxyphenyl)-1-methylethyl]phenyl]ethylidene]bisphenol, 1,1,1-tris(4-hydroxyphenyl)methane, 1,1,1-tris(4-hydroxyphenyl)ethane, 1,1,1-tris(4-hydroxyphenyl)propane, 1,1,1-tris(2-methyl-4-hydroxyphenyl) methane, 1,1,1-tris(2-methyl-4-hydroxyphenyl)ethane, 1,1, 1-tris(3-methyl-4-hydroxyphenyl)methane, 1,1,1-tris(3-methyl-4-hydroxyphenyl)ethane, 1,1,1-tris(3,5-dimethyl-4-hydroxyphenyl)methane, 1,1,1-tris(3,5-dimethyl-4-hydroxyphenyl)ethane, 1,1,1-tris(3-chloro-4-hydroxyphenyl)methane, 1,1,1-tris(3-chloro-4-hydroxyphenyl) ethane, 1,1,1-tris(3,5-dichloro-4-hydroxyphenyl)methane, 1,1,1-tris(3,5-dichloro-4-hydroxyphenyl)ethane, 1,1,1-tris(3-bromo-4-hydroxyphenyl)methane, 1,1,1-tris(3-bromo-4-hydroxyphenyl)ethane, 1,1,1-tris(3,5-dibromo-4- hydroxyphenyl)methane, 1,1,1-tris(3,5-dibromo-4-hydroxyphenyl)ethane, 1,1,1-tris(3-fluoro-4-hydroxyphenyl)methane, 1,1,1-tris(3-fluoro-4-hydroxyphenyl)ethane, 1,1,1-tris(3,5-difluoro-4-hydroxyphenyl)methane, 1,1,1-tris(3,5-difluoro-4-hydroxyphenyl)ethane, 1,1,1-tris(4-hydroxyphenyl)-1-phenylmethane, etc. Among these, 1,1,1-tris(4-hydroxyphenyl)ethane, 4,4'-[1-[4-[1-(4-hydroxyphenyl)-1-methylethyl]phenyl]ethylidene]bisphenol and 2,4,6-tris(4-hydroxyphenyl)-2,6-dimethyl-3-heptene are most preferred in view of reactivity and ease in handling.

Speaking further of the compound having a trifunctional or higher phenolic hydroxyl group which works as a branching agent, it is preferably added in an amount of 0.2-3.0 parts by mole with respect to 100 parts by mole as the sum of 6,6'-dihydroxy-3,3,3',3'-tetramethyl-1,1'-spirobiindan and 4,4'-[1,3 -phenylenebis(1-methylethylidene)]bisphenol. If it is used in less than 0.2 parts by mole, the polycarbonate copolymer (E) is not very effective in improving flowability; if its amount exceeds 3.0 parts by mole, low impact resistance will result.

Preferably, the above-described low Abbe number lens material further contains a uv absorber. The above-described low Abbe number lens material is somewhat inferior in lightfastness compared to alicyclic polyolefin resins that are later shown as preferred examples of the high Abbe number material. Incorporating a uv absorber in the low Abbe number lens material contributes to improving the lightfastness of the low Abbe number lens. As the result, the optical unit of the present invention will exhibit its outstanding optical characteristics over an extended period of time.

The uv absorber to be contained in the low Abbe number lens material encompasses a wide variety of the uv absorbers used in plastic materials and any uv absorber based on either benzotriazoles, benzophenones, salicylates or cyanoacrylates may be employed. Specific examples of benzotriazole-based uv absorbers include 2-(2'-hydroxy-5'-methylphenyl)benzotriazole, 2-(2'-hydroxy-5'-tert-butylphenyl)benzotriazole, 2-(2'-hydroxy-3',5'-di-tert-butylphenyl)benzotriazole, 2-(2-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl)benzotriazole, 2,2'-methylenebis{4-(1,1,3,3-tetramethylbutyl)-6-(2H-benzotriazol-2-yl)phenol}, 2-{2'-hydroxy-3'-(3'',4'',5'',6''-tetrahydrophthalimidomethyl)-5'-methylphenyl}benzotriazole, and 2-(2'-hydroxy-5'-methacryloxyphenyl)-2H-benzotriazole. Specific examples of benzophenone-based uv absorbers include 2,4-dihydroxybenzophenone, 2-hydroxy-4-methoxybenzophenone, 2-hydroxy-4-methoxybenzophenone-5-sulfonic acid, 2-hydroxy-4-octoxybenzophenone, 2-hydroxy-4-dodecyloxybenzophenone, 2,2'-dihydroxy-4-methoxybenzophenone, 2,2'-dihydroxy-4,4'-methoxybenzophenone, 2-hydroxy-4-methoxy-5-sulfobenzophenone, and bis(2-methoxy-4-hydroxy-5-benzoylphenylmethane). Exemplary salicylate-based uv absorbers include phenyl salicylate, p-tert-butylphenyl salicylate, and p-octylphenyl salicylate. Exemplary cyanoacrylate-based uv absorbers include 2-ethylhexyl-2-cyano-3,3-diphenyl acrylate and ethyl-2-cyano-3,3'-diphenyl acrylate.

The amount in which the uv absorbers are contained varies with the type of the uv absorbers; in the case of benzotriazole-based uv absorbers, they are preferably contained in amounts of 0.01-1 part by mass, more preferably 0.05-0.5 parts by mass, per 100 parts by mass of the total mass of the low Abbe number lens material. If the low Abbe number lens material contains the uv absorbers in amounts within the stated ranges, they are adequately effective in improving the lightfastness of the low Abbe number lens fabricated from that lens material.

In order to secure the stability and mold release property that are required in injection molding, the following additives may optionally be contained in the low Abbe number lens material: hindered phenol- or phosphite-based antioxidants; lubricants or mold-release agents including those based on silicons, fatty acid esters, fatty acids, fatty acid glycerides, and natural fats and oils such as beeswax; antistatic agents such as polyalkylene glycols and fatty acid glycerides.

The above-described low Abbe number lens material has the following characteristics favorable to the lens material in optical units for use in high-resolution applications.

Low Birefringence

The above-described low Abbe number lens material is characterized in that it experiences a smaller amount of birefringence than polycarbonate resins such as ones of bisphenol A type that are conventionally used as the lens material in optical units for low-resolution applications. Consider, for example, the case where a lens having an optical surface with a radius of 9 mm and a thickness of 2.5 mm in the central part is fabricated by injection molding; if the lens is made of a polycarbonate resin of bisphenol A type, it experiences a retardation of about 200-400 nm but if it is made of the above-described low Abbe number lens material, the retardation it experiences is about 0-120 nm.

Low Water Absorbency

The above-described low Abbe number lens material is characterized by low water absorbency and, specifically, it has a saturated water absorption of no more than 0.3% as measured in accordance with JIS K7209.

Because of this characteristic, the lens material under consideration will not easily undergo a refractive index change due to moisture and it also provides a lens having improved dimensional stability.

High Flowability

The above-described low Abbe number lens material preferably has an intrinsic viscosity of 0.25-0.5 dl/g. If the intrinsic viscosity of the low Abbe number lens material is within the stated range, the lens material has good enough flowability to be favorable for making a lens by injection molding.

Because of this characteristic, the low Abbe number lens material has good moldability for injection molding of a lens. Hence, lenses can be molded without any molding problems but in various structures.

More preferably, the low Abbe number lens material has an intrinsic viscosity of 0.25-0.35 dl/g. If the intrinsic viscosity of the low Abbe number lens material is 0.25-0.35 dl/g, it can be injection molded at a lower temperature than the polycarbonate resins that are conventionally used as the lens material in optical units for low-resolution applications, specifically at a polymer temperature of 235-260° C. As the result, injection molding can be performed without the risk of forming a thermally deteriorated product and it can be done continuously over an extended period. In the present specification, the term "polymer temperature" means the temperature of the polymer feed at the nozzle and cylinder section of an injection molding machine.

A further advantage of the low Abbe number lens material having an intrinsic viscosity of 0.25-0.35 dl/g is that at a polymer temperature of 235-260° C., it has such a characteristic that the relationship between a shear rate of 100-1,000 $(S^{-1})$, which is commonly adopted in injection molding, and viscosity is close to that of a Newtonian fluid.

In addition, since the low Abbe number lens material is injection molded at lower temperatures than the conventional polycarbonate resins, its thermal deterioration is mitigated. Since a thermally deteriorated lens material will produce a colored lens, mitigation of thermal deterioration is favored by lenses in optical units, particularly ones for high-resolution applications.

As a further advantage, injection molding at lower temperatures reduces the energy required in lens molding and higher yield is obtained in the manufacture of lenses, hence, an optical unit.

In order to ensure that the low Abbe number lens material has an intrinsic viscosity of 0.25-0.5 dl/g, preferably 0.25-0.35 dl/g, a desired amount of the molecular weight regulator may be added as mentioned above when the polycarbonate copolymers (A)-(E) are produced.

Abbe Number

The above-described low Abbe number lens material has an Abbe number of about 23-35 and is preferred for the purpose of combining it with a high Abbe number lens material having an Abbe number of 45-60 in order to correct chromatic aberration.

The high Abbe number lens material is a plastic material having an Abbe number of 45-60 that is used in lenses and other optical applications. Therefore, it is preferably a transparent plastic material that has low birefringence and water absorbency but high dimensional stability. Examples of such plastic materials include methacrylic resins (PMMA), diethyleneglycol bisallyl carbonates, olefin-maleimide alternating copolymers, poly(1,3-cyclohexanediene), polycyclohexanes, alicyclic polyolefin resins, etc. Also useful as the high Abbe number lens material are modified celluloses that are esterified not only with acetic acid but also with other acids such as 2-ethylhexanoic acid and butyric acid in order that the celluloses will have enhanced flowability during melting. Examples of such modified celluloses include those which contain an acetyl group at a molar ratio of 2.43 and a 2-ethylhexanoyl group or a butyryl group at a molar ratio of 0.54, those groups being esterified hydroxyl groups in cellulose.

Among the plastic materials listed above, alicyclic polyolefin resins are preferred since they have characteristics favored by lenses in optical units for high-resolution applications. The alicyclic polyolefin resins have their molecular framework formed of bulky alicyclic structures; they have as low birefringence as PMMA and yet they are far better than PMMA in terms of low water absorbency and high heat resistance.

Specific examples of such alicyclic polyolefin resins include: the norbornane-based alicyclic polyolefin resins disclosed in JP 5-279554 A, JP 2001-072870 A, JP 6-107735 A, JP 6-136035 A and JP 9-263627 A; the alicyclic polyolefin resins that are disclosed in JP 2004-51949 A, JP 2003-313177 A, JP 2003-327630 A, JP 2004-51949 A and JP 2004-067985 A and which are obtained by first subjecting norbornane derivatives having a methacryl group at side chains to ring-opening polymerization with the aid of a metallocene catalyst or the like and then hydrogenating the polymerization product; and the alicyclic polyolefin resins that are disclosed in JP 2001-26693 A, JP 2001-26682 A, JP 2003-321591 A, JP 2003-313247 A, JP 2002-332312 A, JP 2002-275314 A and JP 2002-105131 A and which comprise ethylene-cycloolefin copolymers; commercially available alicyclic polyolefin resins include ZEONEX™ manufactured by ZEON Corporation, ARTON™ manufactured by JSR Corporation, and APEL™ manufactured by Mitsui Chemicals, Inc.

The above-described alicyclic polyolefin resins have the following characteristics favorable to the lens material in optical units for use in high-resolution applications.

Low Birefringence

The above-described alicyclic polyolefin resins are characterized by a smaller amount of birefringence. A lens injection molded from that material (whose optical surface has a radius of 9 mm with a thickness of 2.5 mm in the central part) experiences a retardation of about 0-150 nm. Because of this characteristic, the lens can be combined with the above-described low Abbe number lens for correcting chromatic aberration and yet without causing any adverse effects on resolution.

Low Water Absorbency

The above-described alicyclic polyolefin resins are characterized by very low water absorbency. Specifically, they have a saturated water absorption of less than 0.01% as measured in accordance with JIS K7209. Because of this characteristic, the alicyclic polyolefin resins under consideration will not easily undergo a refractive index change due to moisture and they also provide a lens having improved dimensional stability.

Low Optical Modulus

The above-described alicyclic olefin resins are characterized by low optical modulus. Specifically, their optical modulus is $7.0 \times 10^{-13}$ $cm^2/dyne$ or less.

Compared with a part shaped by injection molding a material having high optical modulus, a part shaped by injection molding a material having low optical modulus has such a characteristic that birefringence will not easily develop in it even if the inherent molecular distortion is comparable to what occurs in the first-mentioned part. Therefore, materials having low optical modulus are preferred for the purpose of shaping parts having a smaller amount of birefringence.

Figure 3:
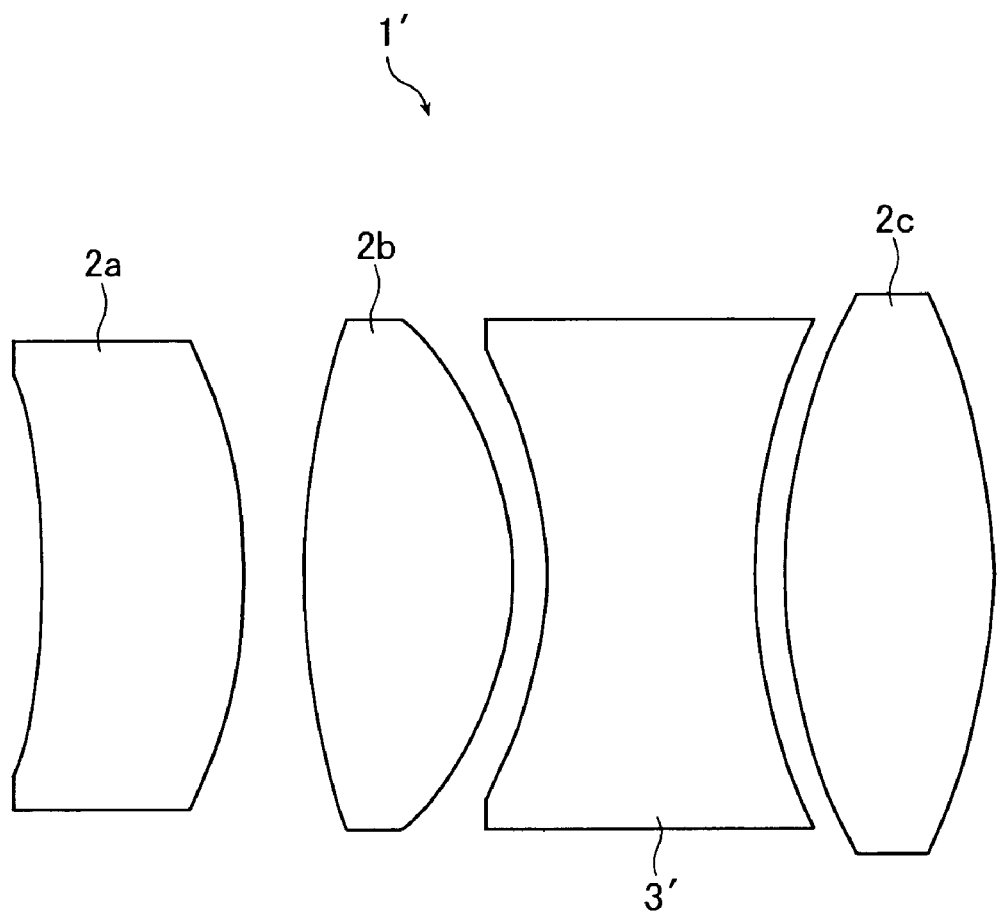
FIG. 3 shows diagrammatically another embodiment of the optical unit of the invention.

The optical unit of the present invention suffices to have at least one high Abbe number lens and at least one low Abbe number lens and it is by no means limited to the optical unit 1 shown in FIG. 1 which has one each of high and low Abbe number lenses, i.e., the high Abbe number lens 2 and the low Abbe number lens 3. In an optical unit for high-resolution applications, a plurality of imaging lens elements, say, at least three of them are used in combination to achieve the desired resolving power and precision. Speaking further of the optical unit of the present invention, as long as it is optically designed to correct chromatic aberration overall, either the high Abbe number lens or the low Abbe number lens may be used as two or more elements or, alternatively, each of the high and low Abbe number lenses may be used as two or more elements. FIG. 3 shows diagrammatically another embodiment of the optical unit of the present invention. The optical unit indicated by 1' in FIG. 3 consists of four lenses 2a, 2b, 2c, and 3'. The lens 3' is a low Abbe number lens with an Abbe number of about 23-35 that is obtained by injection molding the above-described polycarbonate material. Each of the lenses 2a, 2b and 2c is a high Abbe number lens with an Abbe number of 45-60 that is fabricated from the alicyclic polyolefin resins, etc. In short, the optical unit 1' shown in FIG. 3 is composed of four lens elements, one being the low Abbe number lens 3' and the three others being the high Abbe number lenses 2a, 2b and 2c.

When composing the optical unit of three or more lens elements, the high Abbe number lens 2 and the low Abbe number lens 3 may be combined with at least one different lens (hereinafter referred to as "other lenses"). If the optical unit of the present invention has such other lenses, their types, number and position are not limited in any particular way as long as the optical characteristics of the optical unit are not impaired. Hence, other lenses may be provided between the high Abbe number lens 2 and the low Abbe number lens 3. Note, however, that from an optical design viewpoint, the high Abbe number lens 2 and the low Abbe number lens 3 are preferably positioned adjacent to each other.

In the optical unit of the present invention, the high Abbe number lens and the low Abbe number lens may have structural features that can impart the desired characteristics. Specifically, such structural features include, for example, an anti-reflection film, a hard coat, an anti-stain coating, a moisture-proof coating, a light absorbing film that absorbs specified wavelengths of light such as infrared or ultraviolet radiation, and filters that can cut off such radiations. As already noted, the low Abbe number lens material is somewhat inferior in lightfastness to the high Abbe number lens material. Therefore, providing an ultraviolet absorbing film or an ultraviolet cutoff filter on the low Abbe number lens is preferred for the purpose of improving its lightfastness.

The ultraviolet absorbing film may specifically be exemplified by those described in JP 5-113665 A, JP 10-219231 A, JP 11-185502 A and JP 2000-57802 A.

The anti-reflection film is formed of an inorganic or organic material and its layer arrangement may be single- or multi-layered. If desired, a film of inorganic material may be combined with a film of organic material to provide a multi-layered structure. The anti-reflection film may be provided on either one or both sides of a lens or lenses in the optical unit. In the latter case, the anti-reflection films on the two sides may have the same or different layer arrangements. For example, the anti-reflection film on one side may have a multi-layered structure whereas the anti-reflection film on the other side may be simplified to have a single-layered structure.

Exemplary inorganic materials include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, $WO_3$, etc. and these may be used either singly or in combination of two or more kinds. Among these, considering that plastic lenses are contemplated in the present invention, $SiO_2$, $ZrO_2$, $TiO_2$ and $Ta_2O_5$ are preferred since they can be vacuum evaporated at low temperature.

A multi-layered film formed on the lens from inorganic materials may be exemplified by a layered structure comprising, in order from the lens, a $ZrO_2$ layer and a $SiO_2$ layer with a total optical thickness of $\lambda/4$, a $ZrO_2$ layer with an optical thickness of $\lambda/4$, and the outermost $SiO_2$ layer with an optical thickness of $\lambda/4$, such that a layer of high refractive index material alternates with a layer of low refractive index material. Note that $\lambda$ is the design wavelength which is usually chosen at 520 nm. The outermost layer is preferably made of $SiO_2$ since this has low refractive index and can impart mechanical strength to the anti-reflection film.

If the anti-reflection film is to be formed from inorganic materials, a variety of film forming methods can be adopted including, for example, vacuum evaporation, ion plating, sputtering, CVD, and precipitation by chemical reaction in a saturated solution.

Exemplary organic materials include FFP (tetrafluoroethylene-hexafluoropropylene copolymer), PTFE (polytetrafluoroethylene), ETFE (ethylene-tetrafluoroethylene copolymer), etc. and suitable organic materials are chosen considering the refractive indices of the lens materials and the hard coating film (if present). Film forming methods that can be used include not only vacuum evaporation but also highly productive coating methods such as spin coating and dip coating.

The hard coat layer can be made from known uv curable or EB curable acrylic or epoxy resins.

The anti-stain film can be made from water- and oil-repelling materials such fluorine-containing organic polymers.

The moisture-proof coating 14 can be made of a material chosen from a wide range of highly transparent but less moisture permeable candidates and the material may be inorganic or organic.

Suitable inorganic materials include, for example, a silicon nitride such as $Si_3N_4$; a silicon oxynitride, a silicon oxide such as $SiO_2$ and $SiO$; $ZrO_2$, a titanium oxide such as $TiO_2$, $TiO$ and $Ti_2O_3$; $Al_2O_3$, $Ta_2O_5$, $CeO_2$, $MgO$, $Y_2O_3$, $SnO_2$, $MgF_2$, $W_3$, and a mixture consisting of an In/Sn mixed oxide.

If the moisture-proof coating is to be formed of these materials, it preferably has the densest possible structure and absorbs less of the intended wavelengths of light. Therefore, among the inorganic materials listed above, a vitreous film consisting of silicon oxides such as $SiO_2$ and $SiO$, a film consisting of a silicon nitride such as $Si_3N_4$ or a film consisting of a silicon oxynitride are preferably used.

If the moisture-proof coating is to be formed of inorganic materials, its thickness preferably ranges from 10 nm to 1,000 nm (1 μm). If the thickness of the moisture-proof coating is within the stated range, there will be only a few pinholes that affect the moisture barrier quality. To state more specifically, the reason for limiting the thickness of the moisture-proof coating formed of inorganic materials such that it lies within the stated range is as follows: at thicknesses smaller than 10 nm, pinholes may potentially occur and at thicknesses greater than 1,000 nm, the moisture-proof coating makes no further contribution to the purpose of moisture prevention; on the contrary, an increased thickness will lower the production rate, particularly in the case of dry film formation, and residual stress will increase the chance of cracking.

The method of forming the moisture-proof coating from inorganic materials is not limited in any particular way and one can employ a variety of dry processes such as vacuum evaporation, sputtering, ion plating and CVD (chemical vapor deposition), as well as a variety of wet processes including the sol-gel method. A suitable method may be chosen as appropriate for the composition of the moisture-proof coating to be formed, its thickness, and other factors. It is particularly preferred that the thickness of the moisture-proof coating to be formed by dry processes is within the above-mentioned range of 10 nm to 1 μm since the reasons already given for the criticality of that range hold true with greater validity.

There is also no limitation on the method of applying solutions when one employs wet processes such as the sol-gel method and a variety of coating methods can be used, including dip coating, spray coating and spin coating. For advantages such as the capability of forming the desired moisture-proof coating on the entire surface of the lens, dip coating may be mentioned as a preferred example.

If the sol-gel method is adopted, the moisture-proof coating can be formed by, for example, hydrolyzing alkoxysilane compounds. Alternatively, commercial products may be employed and an example is SolGard™ manufactured by Nippon Dacro Shamrock Co., Ltd.

Suitable moisture-proof coatings made of organic materials include, for example, coatings based on poly(vinylidene chloride) and vinylidene chloride/vinyl chloride copolymer, coatings based on alicyclic polyolefin resins such as ZEONEX™ manufactured by ZEON Corporation, coatings based on amorphous fluoropolymers such as CYTOP™ manufactured by Asahi Glass Co., Ltd. and Teflon (registered trademark) AF manufactured by DuPont, coatings based on fluoropolymers such as Novec™ manufactured by Sumito 3M Limited, and coatings based on silicone resins such as Shin-Etsu Silicone KR251, KR400 and KR114A of Shin-Etsu Chemical Co., Ltd. Among these, the coatings based on poly(vinylidene chloride) and vinylidene chloride/vinyl chloride copolymer are preferred.

If the moisture-proof coating is to be formed of organic materials, its thickness preferably ranges from 100 nm to 10,000 nm (10 μm). If the thickness of the moisture-proof coating is within the stated range, there will be only a few pinholes that affect the moisture barrier quality. To state more specifically, the reason for limiting the thickness of the moisture-proof coating to lie within the stated range is as follows: at thicknesses smaller than 100 nm, there is an increased chance for the occurrence of pinholes and at thicknesses greater than 10 μm, the moisture-proof coating makes no further contribution to the purpose of moisture prevention; on the contrary, an extremely thick film tends to lose thickness uniformity, leading to reduced optical performance.

It should further be mentioned that the moisture-proof coating formed of organic materials preferably has good transmission of light rays and low refractive index as its optical characteristics. Low refractive index results in low loss due to surface reflection of incident light, eventually leading to better transmittance of light rays. The moisture-proof coating formed from organic materials may also be adapted to have additional features such as anti-reflection and hard coat.

The method of forming the moisture-proof coating from organic materials is not limited in any particular way and one can employ a variety of wet processes such as a method comprising the steps of preparing a coating solution having the film forming resin component dissolved or dispersed therein, applying the coating solution and drying the applied film, as well as a variety of dry processes such as plasma polymerization and CVD. A suitable method may be chosen as appropriate for the composition of the moisture-proof coating to be formed, its thickness, and other factors.

In the case of wet processes which employ coating solutions, there is no limitation on the method of applying coating solutions and a variety of methods can be employed, including spray coating, brush coating and dip coating. On account of advantages such as the capability of forming the desired moisture-proof coating on the entire lens surface, dip coating may be mentioned as a preferred example.

In particular, in the case of forming the moisture-proof coating from organic materials by applying coating solutions, its thickness is more preferably within the above-mentioned range of 100 nm to 10 μm since the reasons already given for the criticality of that range hold true with greater validity.

The moisture-proof coating may be a single-layered or multi-layered film. In the case of a multi-layered film, it may solely be composed of layers of an inorganic material; alternatively, it may solely be composed of layers of an organic material. It may even be a composite film comprising a layer of inorganic material and a layer of organic material. A moisture-proof coating made of such composite film will develop particularly superior moisture barrier quality. While the reason for this is not clear, it may be theorized that a moisture-proof coating made of inorganic material and a moisture-proof coating made of organic material, which are applied or formed by different mechanisms from different compositions, cooperate to make up or compensate for the defects the other coating has and, at the same time, the moisture resisting properties of the respective coatings develop synergistically to exhibit outstanding moisture resistance.

In general, moisture-proof coatings made of inorganic materials are hard and involve lots of pinholes, cracks and other defects; on the other hand, moisture-proof coatings made of organic materials have a certain degree of elasticity. Therefore, when employing a composite film as the moisture-proof coating, one may provide a moisture-proof coating made of inorganic material in the lower layer and a moisture-proof coating made of organic material in the upper layer; by so doing, the pinholes and other defects in the moisture-proof coating made of inorganic material are effectively filled by the moisture-proof coating made of organic material to eventually form a defect-free coating, thereby developing extremely high moisture barrier quality making the most of the inherently high moisture barrier quality of the moisture-proof coating made of inorganic material. In addition, the elastic moisture-proof coating made of organic material works as a protective film that protects the moisture-proof coating made of inorganic material from external stress or against thermal or otherwise induced expansion/contraction of the lens; consequently, the strength of the moisture-proof coating is sufficiently assured that it exhibits satisfactory moisture resisting property over an extended period of time.

The optical unit of the present invention may have other mechanisms that are preferred for its specific applications such as, for example, silver photographic cameras, digital cameras, video cameras, and miniature cameras that can be built into cell phones. Specific examples of such additional features include a focusing mechanism and a zooming mechanism.

For the reasons set forth hereinabove, the high Abbe number lens and the low Abbe number lens are preferably fabricated by injection molding. The following conditions are preferably adopted in injection molding of each type of lens.

High Abbe Number Lens

Polymer temperature: 240-280° C.

Mold temperature: 100-130° C.

Holding pressure: 20-100 MPa

Cool and hold time in the mold: 30 sec-5 min

Low Abbe Number Lens

Polymer temperature: 235-260° C.

Mold temperature: 90-120° C.

Holding pressure: 30-80 MPa

Cool and hold time in the mold: 60-180 sec

On the following pages, the present invention is described in further detail by means of specific examples. It should, however, be noted that the following examples are for illustrative purposes only and are by no means intend to limit the scope of the invention.

(Production 1)

A flask having an internal capacity of 2 liters was fitted with an agitator equipped with anchor impellers, a reflux condenser, and a submersible pipe for blowing in phosgene (carbonyl chloride). The flask was charged with two monomer feeds, one being a dihydroxy compound represented by the following formula (1a-1) and added in an amount of 138.74 g (0.35 moles) and the other being a dihydroxy compound represented by the following formula (2a-1) and added in an amount of 46.26 g (0.155 moles), as well as phenol added as a molecular weight regulator in an amount of 0.71 g (1.5 mol % in terms of molar ratio to the diol component), and 197.75 g (2.50 moles) of pyridine and 700 g of dichloromethane.

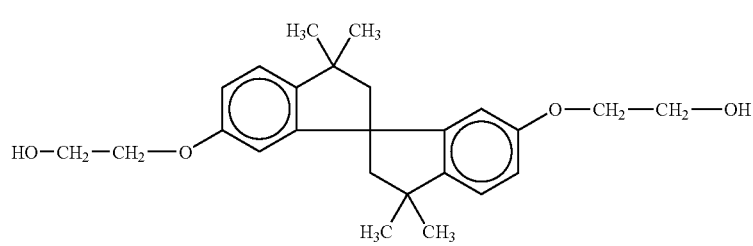

(1a-1)

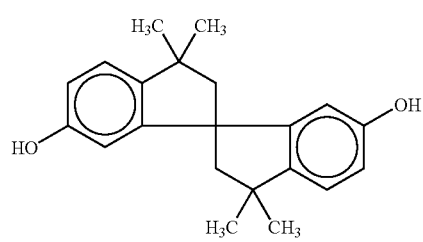

(2a-1)

To the resulting mixture, 64.35 g (0.65 moles) of phosgene was supplied over 3 hours and the reaction mixture was stirred for an additional 2 hours to effect further mixing. After the end of the reaction, the mixture was washed with a 5% aqueous HCl solution and the excess pyridine was removed as a hydrochloride; thereafter, washing with water was repeated until the aqueous layer became neutral. The organic layer was separated out and evaporated to distil off dichloromethane, thereby yielding polycarbonate material PC1. The polycarbonate material PC1 had a mass average molecular weight of 70,000, Tg of 135° C., and a melt viscosity at 220° C. of 150 Pa·sec.

A solution of the polycarbonate material PC1 at a concentration of 0.5 g/dl (solvent: methylene chloride) was subjected to the measurement of intrinsic viscosity [η] at 20° C.; it was found to be within the range of 0.25-0.35 dl/g.

In accordance with JIS K7142, using an Abbe refractometer having wavelength selecting filters attached to a light source, refractive index measurements were made at varying wavelength (C line at 656 nm, D line at 589 nm, and F line at 486 nm) and the refractive indices obtained were used to determine the Abbe number of the polycarbonate material PC1. The temperature of measurement was 25° C. The Abbe number was computed to be 29.

(Production 2)

A flask having an internal capacity of 2 liters was fitted with an agitator equipped with anchor impellers, a reflux condenser, and a submersible pipe for blowing in phosgene (carbonyl chloride). The flask was charged with two monomer feeds, one being a dihydroxy compound represented by the following formula (2a-1) and added in an amount of 77.1 g (0.25 moles) and the other being a dihydroxy compound represented by the following formula (3a-1) and added in an amount of 86.6 g (0.25 moles), as well as 56 g (1.40 moles) of sodium hydroxide, 4-tert-butylphenol added as a molecular weight regulator in an amount of 3.76 g (5 mol % in terms of molar ratio to the diol component), and 600 ml of ion-exchanged water, thereby preparing an aqueous solution.

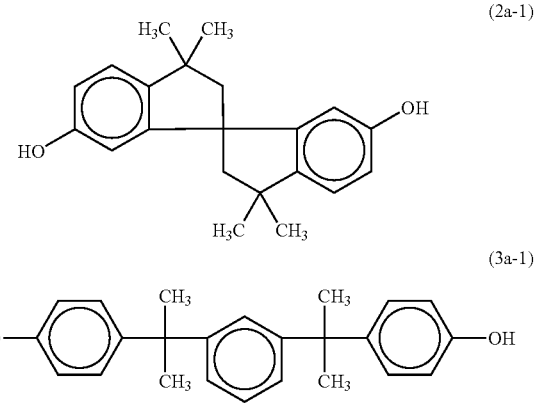

(2a-1)

(3a-1)

Thereafter, 600 ml of dichloromethane was added to the resulting aqueous solution to make a two-phase mixture. To the stirred two-phase mixture, 59.4 g (0.6 moles) of phosgene was supplied at a rate of 9.9 g/min. After the end of phosgene supply, 0.08 g of triethylamine was added to the reaction mixture, which was stirred for an additional 90 minutes to effect further mixing. Stirring was then stopped and the reaction mixture was separated out as the dichloromethane phase and the dichloromethane phase was neutralized with an aqueous HCl solution; using ion-exchanged water, washing was done until no electrolyte was substantially detected in the aqueous washings. Thereafter, the dichloromethane phase was evaporated to distil off dichloromethane, thereby yielding polycarbonate material PC2. The polycarbonate material PC2 had a mass average molecular weight of 35,000, a melt viscosity at 240° C. of 100 Pa.sec., and Tg of 145° C.

A solution of the polycarbonate material PC2 at a concentration of 0.5 g/dl (solvent: methylene chloride) was subjected to the measurement of intrinsic viscosity [η] at 20° C.; it was found to be within the range of 0.25-0.35 dl/g.

In accordance with JIS K7142, using an Abbe refractometer having wavelength selecting filters attached to a light source, refractive index measurements were made at varying wavelength (C line at 656 nm, D line at 589 nm, and F line at 486 nm) and the refractive indices obtained were used to determine the Abbe number of the polycarbonate material PC2. The temperature of measurement was 25° C. The Abbe number was computed to be 29.

EXAMPLE 1

In this Example, low Abbe number lens 3 was injection molded from the polycarbonate PC1 prepared in Production 1, whereas high Abbe number lens 2 was injection molded from ZEONEX™ 480R (product of ZEON Corporation) having an Abbe number of 56.2 (catalogued value for 25° C.) and a water absorbency of less than 0.01%. The two lenses were assembled to make an optical unit 1 shown in FIG. 1.

The polycarbonate material PC1 was dried with a hot-air dryer at 110° C. for 5 hours before it was subjected to injection molding. The cylinder temperature of the injection molding machine was set at 200° C. in the lower portion of the hopper and 240° C. in the other areas. The molten resin was injected into the mold held at 110° C.; the resin was held at a pressure of 50 MPa for 120 seconds in the mold, which was then opened and the low Abbe number lens 3 was recovered as a shaped part. The dimensions of the lens 3 were such that the lensing portion 3a had a radius of 9 mm, with a thickness of 2.5 mm in the central part.

The low Abbe number lens 3 was held between polarizers (crossed nicols) and the interference color was compared with the reference sample to evaluate the retardation in the lensing portion 3a. As it turned out, the retardation in the lensing portion 3a was between 0 and 50 nm.

ZEONEX™ 480R was similarly dried with a hot-air dryer at 110° C. for 5 hours before it was subjected to injection molding. The cylinder temperature of the injection molding machine was set at 230° C. in the lower portion of the hopper and 280° C. in the other areas. The molten resin was injected into the mold held at 125° C.; the resin was held at a pressure of 80 MPa for 130 seconds in the mold, which was then opened and the high Abbe number lens 2 was recovered as a shaped part. The dimensions of the lens 2 were such that the optical surface had a radius of 6.4 mm, with a thickness of 2.9 mm in the central part.

The high Abbe number lens 2 was held between polarizers (crossed nicols) and the interference color was compared with the reference sample to evaluate the retardation in the lensing portion. As it turned out, the retardation in the lensing portion was between 0 and 150 nm.

In all of Examples 2-6 that follow, the high Abbe number lens 2 was employed.

Lenses 2 and 3 fabricated by the above procedures were assembled to make an optical unit 1 shown in FIG. 1. Using the optical unit 1, the effect of lens birefringence on image resolution was evaluated by the following procedure.

Figure 4:
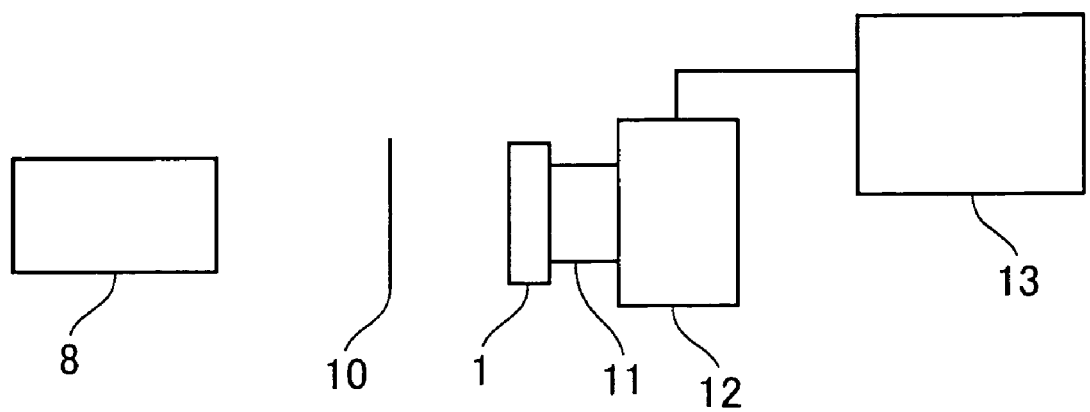
FIG. 4 is a schematic view of an apparatus for evaluating the effect on image of the birefringence of a lens.
Figure 5:
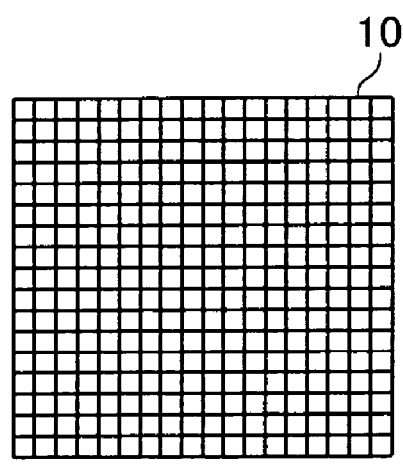
FIG. 5 is a plan view of an imaging chart which is a constituent element of the apparatus shown in FIG. 4.

FIG. 4 is a schematic view of the apparatus used in the evaluation. Looking at FIG. 4, parallel rays of light issuing from a collimated light source 8 pass through an imaging chart 10 to be incident on the optical unit 1. As FIG. 5 shows, the chart 10 is a clear non-birefringent glass plate with a grid pattern of lines drawn on the surface.

The image of the chart 10 was taken by a CCD camera 12 with the aid of the optical unit 1 shown in FIG. 1. The optical unit 1 and the CCD camera 12 were connected by means of an adapter 11 having a focal length adjusting mechanism and a stop mechanism. The image taken by the CCD camera 12 was loaded into a computer 13 as electronic data. The computer 13 contained preloaded reference data for zero birefringence, which was compared with the newly loaded image data using an image computing program; an image deterioration (as judged from image area, shape, etc.) compared with the reference data was evaluated in accordance with the following criteria. The reference data was constructed on computer as theoretically non-birefringent image data.

○: image deterioration barely recognizable
Δ: image deterioration recognizable to some extent
X: image deterioration clearly recognizable.

The results are shown in Table 1.

EXAMPLE 2

In this Example, the polycarbonate PC2 prepared in Production 2 was used as the low Abbe number lens material and ZEONEX™ 480R was used as the high Abbe number lens material. Lenses made of these materials were assembled to make an optical unit 1 shown in FIG. 1.

The low Abbe number lens 3 was injection molded from the polycarbonate material PC2 as in Example 1, except that the cylinder temperature of the injection molding machine was set at 200° C. in the lower portion of the hopper and 250° C. in the other areas.

The low Abbe number lens 3 was held between polarizers (crossed nicols) and the interference color was compared with the reference sample to evaluate the retardation in the lensing portion 3a. As it turned out, the retardation in the lensing portion 3a was between 0 and 50 nm.

The low Abbe number lens 3 and the high Abbe number lens 2 as fabricated in Example 1 were assembled to make an optical unit 1 shown in FIG. 1 and the effect of lens birefringence on image resolution was evaluated by the same procedure as in Example 1. The results are shown in Table 1.

EXAMPLE 3

Pellets were made by melt kneading a mix of 100 parts by mass of the polycarbonate of Production 1 and 0.2 parts by mass of tris(2,4-di-tert-butylphenyl)phosphite in a twin-screw kneader. The pellets were used as a low Abbe number lens material to fabricate a low Abbe number lens 3 by repeating the procedure of Example 1. The lensing portion 3a of the low Abbe number lens 3 had a retardation between 0 and 40 nm. The low Abbe number lens 3 and the high Abbe number lens 2 as fabricated in Example 1 were assembled to make an optical unit 1 shown in FIG. 1 and the effect of lens birefringence on image resolution was evaluated by the same procedure as in Example 1. The results are shown in Table 1.

EXAMPLE 4

Pellets were made by melt kneading a mix of 100 parts by mass of the polycarbonate of Production 2 and 0.2 parts by mass of tris(2,4-di-tert-butylphenyl)phosphite in a twin-screw kneader. The pellets were used as a low Abbe number lens material to fabricate a low Abbe number lens 3 by repeating the procedure of Example 2. The lensing portion 3a of the low Abbe number lens 3 had a retardation between 0 and 40 nm. The low Abbe number lens 3 and the high Abbe number lens 2 as fabricated in Example 1 were assembled to make an optical unit 1 shown in FIG. 1 and the effect of lens birefringence on image resolution was evaluated by the same procedure as in Example 1. The results are shown in Table 1.

EXAMPLE 5

Pellets were made by melt kneading a mix of 100 parts by mass of the polycarbonate of Production 1 and 0.1 part by mass of calcium stearate in a twin-screw kneader. The pellets were used as a low Abbe number lens material to fabricate a low Abbe number lens 3 by repeating the procedure of Example 1. The lensing portion 3*a* of the low Abbe number lens 3 had a retardation between 0 and 40 nm. The low Abbe number lens 3 and the high Abbe number lens 2 as fabricated in Example 1 were assembled to make an optical unit 1 shown in FIG. 1 and the effect of lens birefringence on image resolution was evaluated by the same procedure as in Example 1. The results are shown in Table 1.

EXAMPLE 6

Pellets were made by melt kneading a mix of 100 parts by mass of the polycarbonate of Production 2 and 0.1 part by mass of calcium stearate in a twin-screw kneader. The pellets were used as a low Abbe number lens material to fabricate a low Abbe number lens 3 by repeating the procedure of Example 2. The lensing portion 3*a* of the low Abbe number lens 3 had a retardation between 0 and 40 nm. The low Abbe number lens 3 and the high Abbe number lens 2 as fabricated in Example 1 were combined to make an optical unit 1 shown in FIG. 1 and the effect of lens birefringence on image resolution was evaluated by the same procedure as in Example 1. The results are shown in Table 1.

COMPARATIVE EXAMPLE

Bisphenol A type polycarbonate material PC (AD-5503, product of TEIJIN CHEMICALS LTD.) was used as a low Abbe number lens material. This was a conventional lens material in optical units for low-resolution applications and had an Abbe number of 30 (catalogued value for 25° C.). The polycarbonate material PC was dried with a hot-air dryer at 110° C. for 5 hours before it was subjected to injection molding. The cylinder temperature of the injection molding machine was set at 240° C. in the lower portion of the hopper and 280° C. in the other areas. The molten resin was injected into the mold held at 130° C.; the resin was held at a pressure of 60 MPa for 240 seconds in the mold, which was then opened and a low Abbe number lens 3 was recovered as a shaped part. The dimensions of the lens 3 were such that the lensing portion 3*a* had a radius of 9 mm, with a thickness of 2.5 mm in the central part.

The low Abbe number lens 3 was held between polarizers (crossed nicols) and the interference color was compared with the reference sample to evaluate the retardation in the lensing portion 3*a*. As it turned out, the retardation in the lensing portion was between 200 and 400 nm.

The low Abbe number lens 3 and the high Abbe number lens 2 as fabricated in Example 1 were assembled to make an optical unit 1 shown in FIG. 1 and the effect of lens birefringence on image resolution was evaluated by the same procedure as in Example 1. The results are shown in Table 1.

TABLE 1

| | Material of lens 3 | Image deterioration due to birefringence |
|---|---|---|
| Example 1 | PC1 | ◯ |
| Example 2 | PC2 | ◯ |
| Example 3 | PC1: 100 parts by mass (2,4-di-tert-butylphenyl) phosphite: 0.2 parts by mass | ◯ |
| Example 4 | PC2: 100 parts by mass (2,4-di-tert-butylphenyl) phosphite: 0.2 parts by mass | ◯ |
| Example 5 | PC1: 100 parts by mass calcium stearate: 0.1 part by mass | ◯ |
| Example 6 | PC2: 100 parts by mass calcium stearate: 0.1 part by mass | ◯ |
| Comparative Example | PC | X |

What is claimed is:

1. An optical unit comprising:
   a first lens which is a plastic lens having an Abbe number of 45-60; and
   a second lens which is a lens injection molded from a polycarbonate material comprising a polycarbonate copolymer (A) having structural units represented by the following general formulas (1) and (2):

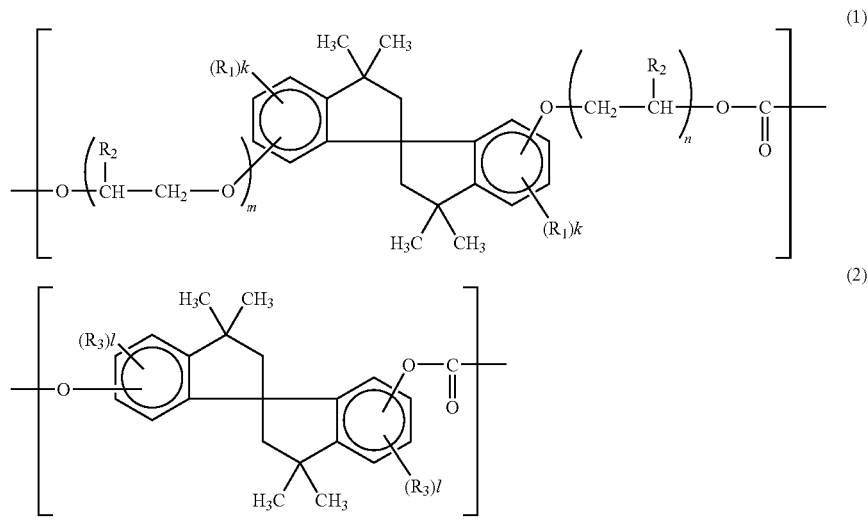

where $R_1$ and $R_3$ are each independently an alkyl group, an alkoxy group, a nitro group or a halogen atom; $R_2$ is a hydrogen atom or a methyl group; k and l are each independently an integer of 0-3; m and n are each independently an integer of 0-20, provided that at least one of m and n is other than zero.

2. The optical unit according to claim 1, wherein said polycarbonate material further contains 0.0005-5 parts by mass of an epoxy compound for 100 parts by mass of said polycarbonate copolymer (A).

3. The optical unit according to claim 1, wherein said polycarbonate material further contains 0.0005-5 parts by mass of a phosphite compound for 100 parts by mass of said polycarbonate copolymer (A).

4. The optical unit according to claim 1, wherein said polycarbonate material further contains 0.0005-5 parts by mass of an aliphatic compound for 100 parts by mass of said polycarbonate copolymer (A).

5. The optical unit according to claim 1, wherein said polycarbonate material further contains 0.00005-0.5 parts by mass of a pentavalent phosphorus compound for 100 parts by mass of said polycarbonate copolymer (A).

6. The optical unit according to claim 1, wherein the proportion of the structural units of the general formulas (1) and (2) that is occupied by the structural unit of the general formula (1) is 5-90 mol %.

7. The optical unit according to claim 1, wherein said polycarbonate material (A) has a mass average molecular weight of 10,000-150,000.

8. An optical unit comprising:
a first lens which is a plastic lens having an Abbe number of 45-60; and
a second lens which is a lens injection molded from a polycarbonate material comprising a polycarbonate copolymer (B) having structural units represented by the following general formulas (2) and (3):

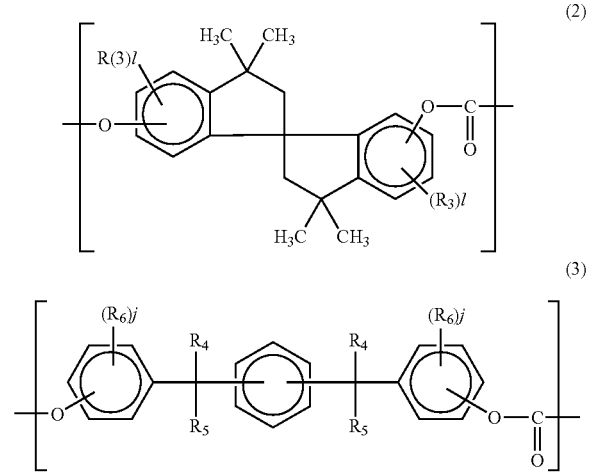

where $R_3$'s are each independently an alkyl group, an alkoxy group, a nitro group or a halogen atom; $R_4$ and $R_5$ are each independently a hydrogen atom or an alkyl group; $R_6$'s are each independently an alkyl group, an alkoxy group or a halogen atom; l's are each independently an integer of 0-3; and j's are each independently an integer of 0-2.

9. The optical unit according to claim 8, wherein said polycarbonate material further contains 0.0005-5 parts by mass of an epoxy compound for 100 parts by mass of said polycarbonate copolymer (B).

10. The optical unit according to claim 8, wherein said polycarbonate material further contains 0.0005-5 parts by mass of a phosphite compound for 100 parts by mass of said polycarbonate copolymer (B).

11. The optical unit according to claim 8, wherein said polycarbonate material further contains 0.0005-5 parts by mass of an aliphatic compound for 100 parts by mass of said polycarbonate copolymer (B).

12. The optical unit according to claim 8, wherein said polycarbonate material further contains 0.00005-0.5 parts by mass of a pentavalent phosphorus compound for 100 parts by mass of said polycarbonate copolymer (B).

13. The optical unit according to claim 8, wherein the proportion of the structural units of the general formulas (2) and (3) that is occupied by the structural unit of the general formula (2) is 5-90 mol %.

14. The optical unit according to claim 8, wherein said polycarbonate material (B) has a mass average molecular weight of 10,000-150,000.

15. An optical unit comprising:
a first lens which is a plastic lens having an Abbe number of 45-60; and
a second lens which is a lens injection molded from a polycarbonate material comprising a polycarbonate copolymer (C) that has structural units represented by the following general formulas (4), (5) and (6) and wherein the structural unit of the general formula (4) assumes 5-50 moles in all structural units:

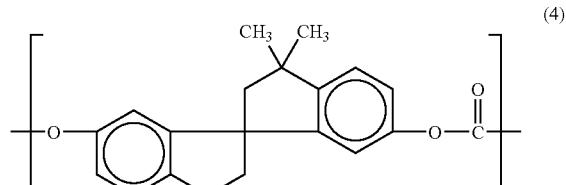

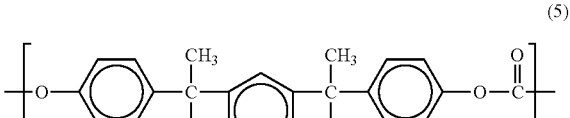

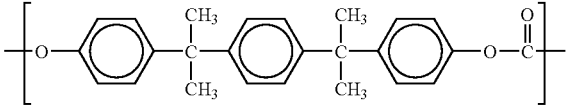

16. The optical unit according to claim 15, wherein said polycarbonate copolymer (C) is the product of reaction of 6,6'-dihydroxy-3,3,3',3'-tetramethyl-1,1'-spirobiindan, 4,4'-[1,3-phenylenebis(1-methylethylidene)]bisphenol, 4,4'-[1,4-phenylenebis(1-methylethylidene)]bisphenol, and a carbonic ester forming compound.

17. The optical unit according to claim 15, wherein said polycarbonate copolymer (C) is the product of reaction of 6,6'-dihydroxy-3,3,3',3'-tetramethyl-1,1'-spirobiindan, 4,4'-[1,3-phenylenebis(1-methylethylidene)]bisphenol, 4,4'-[1,4-phenylenebis(1-methylethylidene)]bisphenol, and a carbonic ester forming compound; and the amount in which 6,6'-dihydroxy-3,3,3',3'-tetramethyl-1,1'-spirobiindan is used in said polycarbonate copolymer (C) is 10-90 mol % with respect to the sum of 6,6'-dihydroxy-3,3,3',3'-tetramethyl-1,1'-spirobiindan and 4,4'-[1,3-phenylenebis(1-methylethylidene)]bisphenol.

18. The optical unit according to claim 15, wherein the structural unit represented by the above general formula (5) assumes 20-80 mol % in all structural units of the polycarbonate copolymer (C).

19. An optical unit comprising:
a first lens which is a plastic lens having an Abbe number of 45-60; and
a second lens which is a lens injection molded from a polycarbonate material comprising a polycarbonate copolymer (D) that has structural units represented by the following general formulas (4), (5) and (7) and wherein the structural unit of the general formula (4) assumes 5-50 mole % in all structural units:

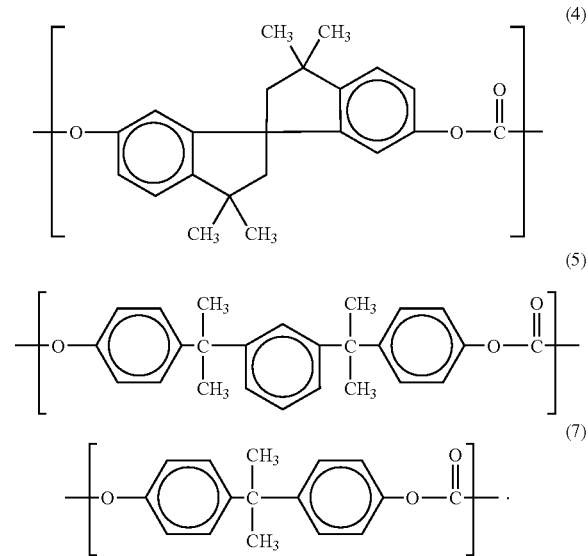

20. An optical unit comprising:
a first lens which is a plastic lens having an Abbe number of 45-60; and
a second lens which is a lens injection molded from a polycarbonate material comprising a polycarbonate copolymer (E) being the product of reaction of 6,6'-dihydroxy-3,3,3',3'-tetramethyl-1,1'-spirobiindan, 4,4'-[1,3-phenylenebis(1-methylethylidene)]bisphenol, a compound having a trifunctional or higher phenolic hydroxyl group and a carbonic ester forming compound.

21. The optical unit according to claim 20, wherein the amount in which 6,6'-dihydroxy-3,3,3',3'-tetramethyl-1,1'-spirobiindan is used in said polycarbonate copolymer (E) is 10-90 mol % with respect to the sum of 6,6'-dihydroxy-3,3,3',3'-tetramethyl-1,1'-spirobiindan and 4,4'-[1,3-phenylenebis(1-methylethylidene)]bisphenol.

22. The optical unit according to claim 20, wherein said polycarbonate copolymer (E) contains the compound having a trifunctional or higher phenolic hydroxyl group added in an amount of 0.2-3.0 parts by mole with respect to 100 parts by mole as the sum of 6,6'-dihydroxy-3,3,3',3'-tetramethyl-1,1'-spirobiindan and 4,4'-[1,3-phenylenebis(1-methylethylidene)]bisphenol.

23. The optical unit according to claim 20, wherein the compound having a trifunctional or higher phenolic hydroxyl group in said polycarbonate copolymer (E) is at least one member of the group consisting of 1,1,1-tris(4-hydroxyphenyl)ethane, 4,4'-[1-[4-[1-(4-hydroxyphenyl)-1-methylethyl]phenyl]ethylidene]bisphenol, and 2,4,6-tris(4-hydroxyphenyl)-2,6-dimethyl-3-heptene.

24. The optical unit according to claim 1, wherein said polycarbonate material has an intrinsic viscosity of 0.25-0.50.

25. The optical unit according to claim 1, wherein said polycarbonate material has an intrinsic viscosity said intrinsic viscosity is 0.25-0.35.

26. The optical unit according to claim 8, wherein said polycarbonate material has an intrinsic viscosity of 0.25-0.50.

27. The optical unit according to claim 8, wherein said polycarbonate material has an intrinsic viscosity said intrinsic viscosity is 0.25-0.35.

28. The optical unit according to claim 15, wherein said polycarbonate material has an intrinsic viscosity of 0.25-0.50.

29. The optical unit according to claim 15, wherein said polycarbonate material has an intrinsic viscosity said intrinsic viscosity is 0.25-0.35.

30. The optical unit according to claim 19, wherein said polycarbonate material has an intrinsic viscosity of 0.25-0.50.

31. The optical unit according to claim 19, wherein said polycarbonate material has an intrinsic viscosity said intrinsic viscosity is 0.25-0.35.

32. The optical unit according to claim 20, wherein said polycarbonate material has an intrinsic viscosity of 0.25-0.50.

33. The optical unit according to claim 20, wherein said polycarbonate material has an intrinsic viscosity said intrinsic viscosity is 0.25-0.35.

34. The optical unit according to claim 1, wherein said plastic lens having an Abbe number of 45-60 is fabricated from an alicyclic polyolefin resin.

35. The optical unit according to claim 8, wherein said plastic lens having an Abbe number of 45-60 is fabricated from an alicyclic polyolefin resin.

36. The optical unit according to claim 15, wherein said plastic lens having an Abbe number of 45-60 is fabricated from an alicyclic polyolefin resin.

37. The optical unit according to claim 19, wherein said plastic lens having an Abbe number of 45-60 is fabricated from an alicyclic polyolefin resin.

38. The optical unit according to claim 20, wherein said plastic lens having an Abbe number of 45-60 is fabricated from an alicyclic polyolefin resin.

39. The optical unit according to claim 1, wherein said polycarbonate material further contains an ultraviolet absorber.

40. The optical unit according to claim 8, wherein said polycarbonate material further contains an ultraviolet absorber.

41. The optical unit according to claim 15, wherein said polycarbonate material further contains an ultraviolet absorber.

42. The optical unit according to claim 19, wherein said polycarbonate material further contains an ultraviolet absorber.

43. The optical unit according to claim 20, wherein said polycarbonate material further contains an ultraviolet absorber.

* * * * *